United States Patent
Nakanishi et al.

(10) Patent No.: US 11,518,855 B2
(45) Date of Patent: Dec. 6, 2022

(54) LOW-DENSITY GEL PRODUCT AND PRODUCTION METHOD THEREFOR

(71) Applicant: KYOTO UNIVERSITY, Kyoto (JP)

(72) Inventors: Kazuki Nakanishi, Kyoto (JP);
Kazuyoshi Kanamori, Kyoto (JP);
Guoqing Zu, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 271 days.

(21) Appl. No.: 16/634,800

(22) PCT Filed: Aug. 23, 2018

(86) PCT No.: PCT/JP2018/031141
§ 371 (c)(1),
(2) Date: Jan. 28, 2020

(87) PCT Pub. No.: WO2019/039541
PCT Pub. Date: Feb. 28, 2019

(65) Prior Publication Data
US 2020/0231758 A1    Jul. 23, 2020

(30) Foreign Application Priority Data
Aug. 25, 2017  (JP) .............................. JP2017-162308

(51) Int. Cl.
*C08G 77/42* (2006.01)
*C08G 77/50* (2006.01)
*C08J 9/28* (2006.01)

(52) U.S. Cl.
CPC ............ *C08G 77/42* (2013.01); *C08G 77/50* (2013.01); *C08J 9/28* (2013.01); *C08J 2201/05* (2013.01); *C08J 2205/024* (2013.01); *C08J 2205/026* (2013.01); *C08J 2383/04* (2013.01); *C08J 2383/10* (2013.01)

(58) Field of Classification Search
CPC ..... C08F 130/08; C08F 230/08; C08G 77/442
See application file for complete search history.

(56) References Cited

U.S. PATENT DOCUMENTS

| | | | |
|---|---|---|---|
| 2005/0192366 A1 | 9/2005 | Ou et al. | |
| 2009/0104401 A1 | 4/2009 | Nakanishi et al. | |
| 2014/0076070 A1 | 3/2014 | Nakanishi et al. | |
| 2015/0299465 A1 | 10/2015 | Toyota et al. | |
| 2017/0298204 A1 | 10/2017 | Matsuo | |
| 2018/0160767 A1* | 6/2018 | Gopalan | C08K 5/00 |
| 2018/0163024 A1* | 6/2018 | Gopalan | C08F 8/12 |
| 2019/0309134 A1* | 10/2019 | Rezaei | C01B 33/155 |
| 2021/0115213 A1* | 4/2021 | Yu | C08L 23/0815 |

FOREIGN PATENT DOCUMENTS

| | | |
|---|---|---|
| JP | 2000230073 | 8/2000 |
| JP | 2003128825 | 5/2003 |
| JP | 2007519780 | 7/2007 |
| JP | 2014061457 | 4/2014 |
| JP | 2015212360 | 11/2015 |
| JP | 2016069499 | 5/2016 |
| WO | 2005098553 | 10/2005 |
| WO | 2007010949 | 1/2007 |
| WO | 2018097106 | 5/2018 |
| WO | WO 2018/097106 | * 5/2018 |

OTHER PUBLICATIONS

Transparent, Superflexible, Doubly Cross-linked Polyvinylmethylsiloxane Aerogel Superinsulators via Ambient Pressure Drying authored by Zu et al. and published in ACS Nano (2018) 12, 521-532.*
Translation of WO 2018/097106 (no date).*
"Transparent, Highly Insulating Polyethyl- and Polyvinylsilsesquioxane Aerogels: Mechanical Improvements by Vulcanization for Ambient Pressure Drying" authored by Shimizu et al. and published in Chemistry of Materials (2016) 28, 6860-6868.*
Machine translation of CN 111154036 (no date).*
International Search Report and Written Opinion issued for International Patent Application No. PCT/JP2018/031141, dated Nov. 20, 2018, 11 pages including English translation of Search Report.
Extended European Search Report issued for European Patent Application No. 18847834.1, dated Mar. 19, 2021, 7 pages.
Shimizu, T. et al., "Transparent, Highly Insulating Polyethyl- and Polyvinylsilsesquioxane Aerogels: Mechanical Improvements by Vulcanization for Ambient Pressure Drying," Chemistry of Materials, 2016, 28, pp. 6860-6868.

* cited by examiner

*Primary Examiner* — Marc S Zimmer
(74) *Attorney, Agent, or Firm* — Hamre, Schumann, Mueller & Larson, P.C.

(57) ABSTRACT

A low-density gel product of the present disclosure has a skeleton containing a polysiloxane chain and an organic polymer chain. In the skeleton, the polysiloxane chain and the organic polymer chain are bonded to each other by covalent bonds at a plurality of positions on both of the chains with silicon atoms of the polysiloxane chain as bonding points. The organic polymer chain may be an aliphatic hydrocarbon chain. The polysiloxane chain may be a polyorganosiloxane chain. The low-density gel product of the present disclosure is a novel low-density gel product with improved mechanical properties including bending flexibility.

21 Claims, 21 Drawing Sheets

LOW-DENSITY GEL PRODUCT AND PRODUCTION METHOD THEREFOR

TECHNICAL FIELD

The present invention relates to a low-density gel product and a method for producing a low-density gel product.

BACKGROUND ART

Low-density gel products such as aerogels and xerogels are solid-phase gel products having a high porosity and a low density as indicated by their name. The low-density gel products exhibit distinctive properties such as low specific gravity, high specific surface area, and low thermal conductivity (high heat insulation). Due to these excellent properties, the low-density gel products are expected to be applied to various uses as, for example, thermal insulators, acoustic insulators, carriers, adsorbents, etc. However, while the conventional low-density gel products exhibit the above excellent properties because of their low density, the conventional low-density gel products are brittle (exhibit low mechanical properties) because of their low density. This brittleness and the fact that high-cost supercritical drying is essential for the production of low-density gel products due to this brittleness, are obstacles to putting the low-density gel products into various practical uses. As a more specific example, silica aerogels generally exhibit a low specific gravity, a low thermal conductivity, and high optical transparency. These features are advantageous for use as an interlayer (thermal insulation layer) of insulated glazing. However, the low mechanical properties of the silica aerogels are an obstacle to putting the silica aerogels to practical use for this application.

For silica-based low-density gel products, attempts have been made to improve the mechanical properties. In one example of such an attempt, in production of a low-density gel product by a sol-gel process, a mixture of a trifunctional silicon compound such as methyltrimethoxysilane and a bifunctional silicon compound such as dimethyldimethoxysilane has been used as a raw material compound. In this method, a skeleton having a structure, in which a three-dimensional network of polysilsesquioxane derived from the trifunctional silicon compound and a linear polysiloxane chain (polysiloxane chain having no branch of a siloxane bond) that is derived from the bifunctional silicon compound and that is relatively flexible as compared to the three-dimensional network are mixed, is formed, thereby improving the mechanical properties of the low-density gel product. Patent Literatures 1 to 3 disclose low-density gel products formed by the above method.

CITATION LIST

Patent Literature

Patent Literature 1: WO 2007/010949 A1
Patent Literature 2: JP 2014-61457 A
Patent Literature 3: JP 2016-69499 A

SUMMARY OF INVENTION

Technical Problem

The mechanical properties of low-density gel products include strength, flexibility, restorability, etc., with respect to compressive force in one direction (hereinafter, referred to as "compression flexibility"). The compression flexibility of low-density gel products is also disclosed in Patent Literatures 1 to 3. According to the study by the present inventors, as mechanical properties required for putting low-density gel products into practical use, the levels of strength, flexibility, restorability, etc., with respect to force that bends a low-density gel product (hereinafter, referred to as "bending flexibility") are also important in addition to the level of compression flexibility. However, bending flexibility is not taken into consideration at all for conventional low-density gel products. Conventional low-density gel products are easily destroyed by force that bends the gel products, or, regarding gel products having a certain degree of bending flexibility, the degree is still insufficient.

An object of the present invention is to provide a novel low-density gel product with improved mechanical properties including bending flexibility, and a production method therefor.

Solution to Problem

The present invention provides a low-density gel product having a skeleton containing a polysiloxane chain and an organic polymer chain, wherein in the skeleton, the polysiloxane chain and the organic polymer chain are bonded to each other by covalent bonds at a plurality of positions on both of the chains with silicon atoms of the polysiloxane chain as bonding points.

According to another aspect, the present invention provides a method for producing a low-density gel product, including:

a gelling step of, in a solution system containing an organic precursor chain having repeating units A each having, at a side chain, a silicon atom to which two or more hydrolyzable functional groups are bonded, causing a hydrolysis reaction of the functional groups located at the side chains of the repeating units A and a polycondensation reaction between the side chains having the silicon atoms to proceed by a sol-gel process, and forming an organic polymer chain containing a main chain of the organic precursor chain, and a polysiloxane chain that contains the silicon atoms and that is bonded to the organic polymer chain by covalent bonds at a plurality of positions, on the organic polymer chain, at which the side chains are bonded, and forming a wet gel including a skeleton phase that is rich in the polysiloxane chain and the organic polymer chain and a solution phase that is rich in a solvent of the solution system; and a drying step of drying the wet gel to obtain, with the skeleton phase as a skeleton and the solution phase as pores, a low-density gel product having the pores and the skeleton containing the polysiloxane chain and the organic polymer chain bonded to each other.

Advantageous Effects of Invention

According to the present invention, a novel low-density gel product with improved mechanical properties including bending flexibility and a production method therefor are achieved.

DESCRIPTION OF EMBODIMENTS

Figure 1:
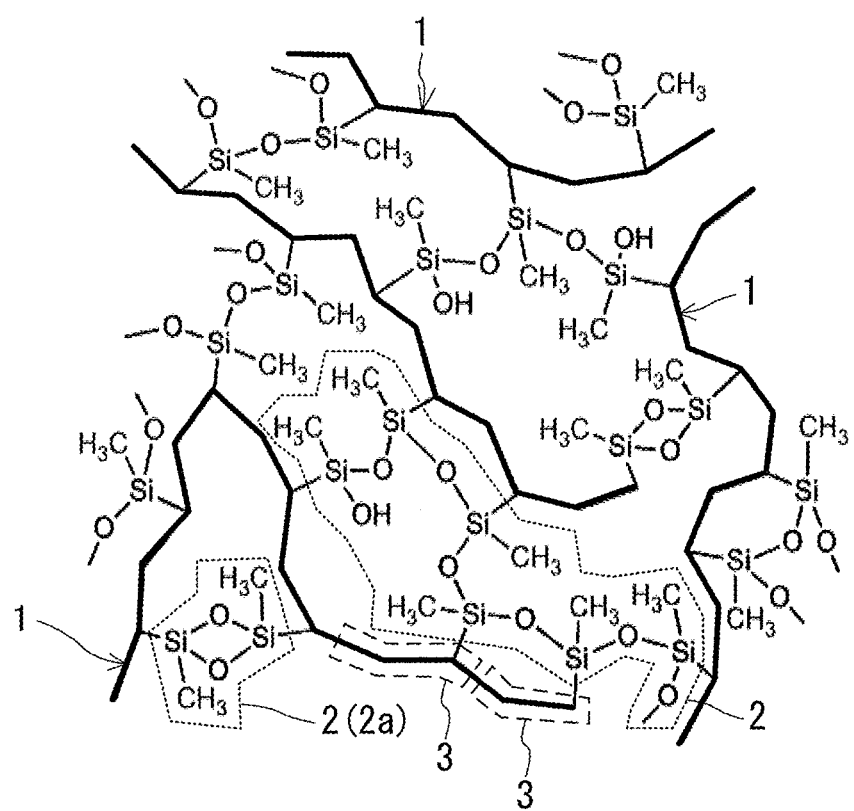
FIG. 1 is a schematic diagram showing an example of a molecular structure in the skeleton of the low-density gel product of the present disclosure.

In the present specification, on the basis of the proposal by IUPAC, a pore having a hole diameter (pore diameter) more than 50 nm is referred to as a macropore, and a pore having a hole diameter of 2 nm or more and 50 nm or less is referred to as a mesopore. A pore having a hole diameter less than 2 nm is generally referred to as a micropore. The hole diameters and the average hole diameter of pores can be determined by general porosimetry selected on the basis of the magnitudes of predicted hole diameters and average hole diameter, for example, by porosimetry using a mercury intrusion method for macropores, and porosimetry using a nitrogen gas adsorption method for mesopores.

[Low-Density Gel Product]

The low-density gel product of the present disclosure is a solid-phase gel product having a skeleton (framework) and pores (holes). Both the skeleton and the pores are continuous phases having a three-dimensional network structure, and are distributed within the gel product so as to be entangled with each other. The skeleton forms the wall surfaces of the pores.

The density (specific gravity) of the low-density gel product is, for example, 0.5 g/cm$^3$ or less, and may be 0.4 g/cm$^3$ or less, 0.35 g/cm$^2$ or less, 0.3 g/cm$^2$ or less, or even 0.25 g/cm$^2$ or less. The lower limit of the density is not limited, but the density is, for example, 0.05 g/cm$^2$ or more. The density of the low-density gel product may be 0.16 to 0.31 g/cm$^2$.

The low-density gel product of the present disclosure has a skeleton containing a polysiloxane chain and an organic polymer chain. The polysiloxane chain is a chain in which two or more siloxane bonds (—Si—O—) are continuous. The polysiloxane chain may or may not have a branch of a siloxane bond starting from a silicon (Si) atom forming the chain. Regarding the structural units of a polysiloxane chain in which siloxane bonds are continuous, notation of Q unit (unit having two branches starting from one silicon atom), T unit (unit having one branch starting from one silicon atom), and D unit (unit having no branch) is well known to those skilled in the art. In the skeleton of the low-density gel product of the present disclosure, the polysiloxane chain and the organic polymer chain are bonded to each other by covalent bonds at a plurality of positions on both chains with the Si atoms of the polysiloxane chains as bonding points (bonding points at the polysiloxane chain side). One bond of the Si atom is used in the covalent bond, and thus the polysiloxane chain contained in the skeleton contains a plurality of T units and/or D units. The polysiloxane chain can be composed of T units and/or D units, or can be composed of D units. The polysiloxane chain composed of D units is a linear polysiloxane chain that does not have the above branch of the siloxane bond. The polysiloxane chain may further contain Q units. The polysiloxane chain containing T units and/or Q units can form a three-dimensional molecular network of siloxane bonds based on the branch. The types of units of the polysiloxane chain contained in the skeleton, and the content of each type of unit can be controlled, for example, by the structure of an organic precursor chain in a later-described production method, more specifically, by the type and the content of repeating units A in the organic precursor chain, the type and the content of a silicon compound used for forming the organic precursor chain in a precursor forming step, etc. The skeleton of the low-density gel product of the present disclosure may contain a plurality of polysiloxane chains having different types and/or contents of structural units contained.

The polysiloxane chain contained in the skeleton of the low-density gel product of the present disclosure may be a polyorganosiloxane chain. The polyorganosiloxane chain has structural units in each of which at least one organo group, typically, one organo group, is bonded to one Si atom forming the chain. The organo group is a non-polymerizable organic group, and typically a monovalent group. The organo group constitutes a terminal group branched from the polysiloxane chain with an Si atom as a branch point. The structural units in each of which the organo group is bonded are D units. Each of the structural units that are D units can form the above covalent bond with the organic polymer chain via a remaining one bond of the Si atom. The polyorganosiloxane chain can be a chain composed of D units.

The organic polymer chain is a chain formed by polymerization of an organic polymerizable group. The organic polymer chain may contain the main chain of a polymer formed by polymerization of an organic monomer having the polymerizable group, or may be the main chain of the polymer. The organic polymer chain may or may not contain Si atoms, but typically does not contain Si atoms.

FIG. 1 shows an example of the molecular structure in the skeleton of the low-density gel product of the present disclosure. The skeleton shown in the example in FIG. 1 contains a polyorganosiloxane chain as the polysiloxane chain. One type of the polyorganosiloxane chain contained in the skeleton is a linear chain composed of D units in each of which a methyl group (—CH$_3$ group) is bonded as an organo group. In the skeleton, a polysiloxane chain (the polyorganosiloxane chain in the example in FIG. 1) 2 and an organic polymer chain 1 are bonded to each other by covalent bonds at a plurality of positions on both chains 1 and 2 with the Si atoms of the polysiloxane chain 2 as bonding points at the polysiloxane chain 2 side. A plurality of Si atoms that are bonding points in the example in FIG. 1 are present at locations other than the ends of the polysiloxane chain 2. The Si atoms at the ends of the polysiloxane chain 2 can be bonding points with the organic polymer chain 1. FIG. 1 shows the Si atoms at the ends of the polysiloxane chain 2 that are bonding points with the organic polymer chain 1. In the skeleton, not only a linear polysiloxane chain 2 but also a cyclic polysiloxane chain 2a is present. An Si atom to which a hydroxyl group (—OH group) is bonded and which is located at an end of the polysiloxane chain 2 is present. The polysiloxane chain 2 and the organic polymer chain 1 are bonded to each other at each of repeating units 3 of the organic polymer chain 1. In addition, the polysiloxane chain 2 and the organic polymer chain 1 are bonded to each other via a bond of the Si atom of each of the D units of the polysiloxane chain 2. The polysiloxane chain 2 and the organic polymer chain 1 form a complex molecular network in which the polysiloxane chain 2 and the organic polymer chain 1 extend in three-dimensional directions while being entangled with each other.

The molecular structure in the skeleton of the low-density gel product of the present disclosure can be regarded as a structure in which a network of a plurality of the polysiloxane chains 2 is crosslinked by the organic polymer chain 1 at a plurality of the bonding points. In addition, the molecular structure in the skeleton of the low-density gel product of the present disclosure can also be regarded as a structure containing the organic polymer chain 1 and the polysiloxane chain 2 that is a polymer chain of a plurality of side chains each having an Si atom in the organic polymer chain 1, for example, a side chain present at each of the specific repeating units 3 of the organic polymer chain 1. In this respect, the polysiloxane chain 2 can be a polymer chain within one organic polymer chain 1, or can be a polymer chain between two or more organic polymer chains 1.

As is also obvious from FIG. 1, the skeleton of the low-density gel product of the present disclosure is totally different from the skeleton of a conventional organic-inorganic hybrid gel composed of a polysilsesquioxane chain and a linear polyorganosiloxane chain, or the skeleton of a low-density gel product obtained by mixing nanofibers into silica.

The low-density gel product of the present disclosure having the above-described skeleton containing the polysiloxane chain 2 and the organic polymer chain 1 has a low density unique to a low-density gel product, but has high mechanical properties including bending flexibility. More specifically, the low-density gel product of the present disclosure has high strength (breaking strength), flexibility, restorability, etc., with respect to force (compressive force) that compresses the gel product in one direction, and also has high strength (breaking strength), flexibility, restorability, etc., with respect to force (bending force) that bends the gel product. Such high mechanical properties are based on the fact that high strength, flexibility, and restorability with respect to compressive force and bending force are achieved by the organic polymer chain 1, which is relatively flexible as compared to a polysiloxane chain, particularly, a polysiloxane chain having a three-dimensional molecular network structure, and the polysiloxane chain 2 being bonded to each other by covalent bonds at a plurality of positions.

Moreover, in the case where the skeleton contains a polyorganosiloxane chain, particularly, a polyorganosiloxane chain containing D units, higher strength, flexibility, and restorability with respect to bending force are expected for the following reasons (1) and (2).

(1) When the polysiloxane chain 2 has an organo group bonded to an Si atom, repulsive force between three-dimensional molecules occurs between the organo group that is the terminal group branched from the polysiloxane chain 2, and the organic polymer chain 1 and the polysiloxane chain 2 adjacent to this group, whereby great restoring force from the above compression and the above bending is generated.

(2) The molecular structure of the polysiloxane chain 2 containing D units, particularly, the polysiloxane chain 2 composed of D units, is more flexible than the three-dimensional molecular network of a polysilsesquioxane chain or the like.

The low-density gel product of the present disclosure can have, for example, the following mechanical properties.

The elastic modulus (Young's modulus) is, for example, 0.5 MPa or more, and can be 1 MPa or more, or even 5 MPa or more, depending on the structure of the low-density gel product. The upper limit of the elastic modulus is not limited, but the elastic modulus is, for example, 50 MPa or less. The elastic modulus can be determined by measurement of a stress-strain curve (S-S curve) with compression (uniaxial compression) in one direction.

The strength with respect to compressive force is, for example, 1 MPa or more, as maximum breaking strength determined by measurement of an S-S curve with uniaxial compression (maximum strength reached until a breaking point due to fracture occurs on the curve), and can be 10 MPa or more, or even 20 MPa or more, depending on the structure of the low-density gel product. The upper limit of the strength is not limited, but the strength is, for example, 500 MPa or less.

Regarding flexibility and restorability with respect to compressive force, the low-density gel product of the present disclosure has, for example, restorability with respect to uniaxial compression with a compression rate of 50%, and has restorability with respect to uniaxial compression with a compression rate of 60%, 70%, or even 80%, depending on the structure of the low-density gel product. The "restorability with respect to uniaxial compression" in the present specification means a property in which a breaking point due to fracture does not occur on an S-S curve when an object to be evaluated is uniaxially compressed in a certain direction ("strain" of the curve can be regarded as a compression rate) and the object to be evaluated can recover from the strain when the compressive force is removed. However, it is not necessary to be able to recover from the strain by 100% (fully recover to the initial state before the compression). Unless a breaking point occurs, the compression (compression rate) may remain when the compressive force is removed, and a value obtained by subtracting a compression rate (%) finally remaining in the low-density gel product from 100% can be regarded as a restoration rate (%) of the object to be evaluated. The restoration rate is also an index for the compression flexibility of the low-density gel product, and the higher the restoration rate is, the higher the compression flexibility of the low-density gel product is.

The restoration rate of the low-density gel product of the present disclosure with respect to uniaxial compression with a compression rate of 50%, is, for example, 80% or more, and can be 85% or more, 90% or more, or even 95% or more, depending on the structure of the low-density gel product. In addition, depending on the structure of the low-density gel product, the restoration rate with respect to uniaxial compression with a compression rate of 60%, 70%, or even 80% can be in the same numerical range.

The low-density gel product of the present disclosure can exhibit at least one property selected from the above elastic modulus, strength, restorability, and restoration rate, even when the uniaxial compression test is performed a plurality of times (a plurality of application and release cycles each of which is one cycle in which compressive force is applied and released are performed), depending on the structure of the gel product. The number of cycles is, for example, 10 times, and can be 20, 40, 50, 70, 90, or even 100 times.

The strength with respect to bending force is, for example, 0.01 MPa or more, as maximum breaking strength determined by measurement of a stress-strain curve (S-S curve) with a three-point flexural test (maximum strength reached until a breaking point due to fracture occurs on the curve), and can be 0.1 MPa or more, or even 0.2 MPa or more, depending on the structure of the low-density gel product. The upper limit of the strength is not limited, but the strength is, for example, 10 MPa or less.

Regarding flexibility and restorability with respect to bending force, the low-density gel product of the present disclosure has restorability with respect to bending of 10 mm as a displacement amount of a load point corresponding to a strain amount, in a three-point flexural test described later in examples, and the low-density gel product of the present disclosure can have restorability with respect to bending of 12 mm, 15 mm, 17 mm, or even 20 mm as the displacement amount, depending on the structure of the low-density gel product. The "restorability with respect to bending" in the present specification means a property in which a breaking point due to fracture does not occur on an S-S curve by the three-point flexural test and recovery from strain can be made when the bending force is removed. However, it is not necessary to be able to recover from the strain by 100% (fully recover to the initial state before the bending force is applied). Unless a breaking point occurs, a displacement amount may remain when the bending force is removed, and the value obtained by subtracting the ratio (%) of a displacement amount finally remaining in the low-density gel product to the maximum displacement amount applied to the low-density gel product, from 100%, can be regarded as a restoration rate (%) of the object to be evaluated. This restoration rate is also an index for the bending flexibility of the low-density gel product, and the higher the restoration rate is, the higher the bending flexibility of the low-density gel product is.

The restoration rate of the low-density gel product of the present disclosure with respect to bending of 10 mm as a displacement amount of a load point corresponding to a strain amount, in the three-point flexural test described later in the examples, is, for example, 80% or more, and can be 85% or more, 90% or more, or even 95% or more, depending on the structure of the low-density gel product. In addition, depending on the structure of the low-density gel product, the restoration rate with respect to bending of 12 mm, 15 mm, 17 mm, or even 20 mm as the displacement amount can be in the same numerical range.

The low-density gel product of the present disclosure can exhibit at least one property selected from the above elastic modulus, strength, restorability, and restoration rate, even when the three-point flexural test is performed a plurality of times (a plurality of application and release cycles each of which is one cycle in which a load is applied to a load point and released are performed), depending on the structure of the gel product. The number of cycles is, for example, 10 times, and can be 20, 40, 50, 70, 90, or even 100 times.

The low-density gel product of the present disclosure can be wound around a shaft having a radius of curvature of 10 to 30 mm, for example, a cylinder having a diameter of 10 to 30 mm, by, for example, 90° or more, or by 120° or more, 150° or more, 180° or more, 210° or more, 240° or more, 270° or more, or even 360° or more, depending on the structure of the gel product. There is no conventional low-density gel product that can be wound as described above.

The low-density gel product of the present disclosure may be a low-density gel product that has a skeleton containing a polysiloxane chain and an organic polymer chain and that has at least one of the above-described mechanical properties, particularly, at least one of the mechanical properties with respect to bending force.

The low-density gel product of the present disclosure may be an aerogel or a xerogel. The difference in name between aerogel and xerogel is derived from the difference in a drying method when forming a solid-phase low-density gel product from a wet gel. A solid-phase low-density gel product formed by supercritical drying is generally referred to as an aerogel, and a solid-phase low-density gel product formed by normal-pressure drying is generally referred to as a xerogel. The low-density gel product of the present disclosure has high mechanical properties, that is, normal-pressure drying can be performed for the low-density gel product of the present disclosure, and thus the low-density gel product of the present disclosure can be a xerogel. As a matter of course, the low-density gel product of the present disclosure may be a low-density gel product with another name formed by still another drying method, for example, freeze-drying, such as cryogel.

The specific structure of the organic polymer chain 1 is not limited. The organic polymer chain 1 is preferably an aliphatic hydrocarbon chain since the mechanical properties including bending flexibility are further improved. The aliphatic hydrocarbon chain may contain at least one type of atom selected from an oxygen atom, a nitrogen atom, a sulfur atom, and a halogen atom, in addition to a carbon atom and a hydrogen atom.

The organic polymer chain 1 may have specific repeating units B each having an atom (atom serving as a bonding point, at the organic polymer chain 1 side, with the polysiloxane chain 2) bonded to an Si atom of the polysiloxane chain 2. The atom may be located at a side chain of the repeating unit B (a side chain of the organic polymer chain 1), or may be located at the main chain of the repeating unit B (the main chain of the organic polymer chain 1). Each repeating unit B is, for example, a unit represented by the following formula (2).

[Chem. 1]

$R^4$ in formula (2) is a hydrogen atom, an alkyl group that may have a branch, a phenyl group that may have a substituent, a hydroxyl group, or a halogen atom. The alkyl group is, for example, an alkyl group having 1 to 4 carbon atoms, and may be a methyl group or an ethyl group, or may be a methyl group. The halogen atom is, for example, a fluorine atom or a chlorine atom. The substituent that the phenyl group may have is, for example, a halogen atom such as a fluorine atom, a chlorine atom, and a bromine atom; a hydroxyl group; or a carboxy group. $R^4$ may be a hydrogen atom or a methyl group.

$R^5$ and $R^6$ are each independently a hydrogen atom, an alkyl group that may have a branch, a phenyl group that may have a substituent, a hydroxyl group, a halogen atom, an N,N-dimethylamide group, an N-isopropylamide group, a carboxyl group, or a carboxyl ester group ($—COOR^7$). Examples of the alkyl group, the halogen atom, and the substituent that the phenyl group may have are the same as described above for $R^4$. $R^5$ and $R^6$ may each be independently a hydrogen atom, a methyl group, a carboxyl group, or a carboxyl ester group. $R^7$ is, for example, a methyl group, an ethyl group, a propyl group, or an isopropyl group, and may be a methyl group or an ethyl group.

In one example of a combination of $R^4$ to $R^6$, $R^4$ to $R^6$ are each independently a hydrogen atom or a methyl group.

A linking part L in formula (2) may be, for example, an alkylene group that may be cyclic or may have a branch and that has 1 to 10 carbon atoms; a phenylene group that may have a substituent; an amide group; an ester group; an ether group; or a combination thereof. The substituent that the phenylene group may have is the same as the substituent, described above for $R^4$, that the phenyl group may have. The ester group is, for example, a carboxy ester group represented by $—COOR^7$. The linking part L may be a methylene group, an ethylene group, or a propylene ester group. However, in formula (2), the linking part L does not have to be present. In the case where the organic polymer chain 1 has repeating units B each represented by formula (2), when L is present, L located at a side chain can form a bond with a silicon atom of the polysiloxane chain 2 (can be a bonding point at the organic polymer chain 1 side), and, when L is not present, a carbon atom C* of the main chain can form such a bond.

In the case where $R^4$ to $R^6$ are each a hydrogen atom, the repeating unit of formula (2) is a vinyl monomer unit. In this case, the organic polymer chain 1 can be a vinyl polymer chain that may contain a linking part L.

In the case where $R^4$ is a group other than a hydrogen atom, and $R^5$ and $R^6$ are each a hydrogen atom, the repeating unit of formula (2) is a vinylidene monomer unit. In this case, the organic polymer chain 1 can be a vinylidene polymer chain that may contain a linking part L.

In the case where any one group of $R^4$ to $R^6$ is a methyl group, and the remaining two groups are each a hydrogen atom, the repeating unit of formula (2) is an allyl monomer unit. In this case, the organic polymer chain 1 can be an allyl polymer chain that may contain a linking part L. Moreover, in the case where $R^4$ to $R^6$ are each a hydrogen atom, and the linking part L is a methylene group, the repeating unit of formula (2) is also an allyl monomer unit having an allyl structure, more specifically, an allyl structure containing a C—C* structure of the main chain. An example of the allyl monomer unit is an allyl monomer unit or an allyl methyl monomer unit. In this case, the organic polymer chain 1 can be an allyl polymer chain.

In the case where $R^4$ is a hydrogen atom or a methyl group, $R^5$ is a hydrogen atom, and $R^6$ is a carboxyl group or a carboxyl ester group (—COOR$^7$), the repeating unit of formula (2) is a (meth)acrylic monomer unit. In this case, the organic polymer chain 1 can be a (meth)acrylic polymer chain that may contain a linking part L. Moreover, in the case where the linking part L has a carboxy ester group bonded to the carbon atom C*, for example, in the case where the linking part L is a (meth)acryloxypropyl group, the repeating unit of formula (2) is a (meth)acrylic monomer unit having a (meth)acrylic structure, more specifically, a (meth)acrylic structure containing a C—C* structure of the main chain. An example of the (meth)acrylic monomer unit is a (meth)acryloxypropyl monomer unit or a (meth)acryloxypropyl methyl monomer unit. In this case, the organic polymer chain 1 can be a (meth)acrylic polymer chain.

That is, the organic polymer chain 1 can be a vinyl polymer chain, a vinylidene polymer chain, an allyl polymer chain, or a (meth)acrylic polymer chain.

In the case where the organic polymer chain 1 has the repeating units B, the polysiloxane chain 2 and the organic polymer chain 1 may be bonded to each other at the repeating units B. In the example shown in FIG. 1, the repeating units 3 are the repeating units B, and such bonds are formed at the repeating units 3. However, in the skeleton of the low-density gel product of the present disclosure, the organic polymer chain 1 and the polysiloxane chain 2 do not necessarily have to be bonded to each other at all the repeating units B.

The organic polymer chain 1 may be a main chain of polyvinylmethyldimethoxysilane (PVMDMS). In addition, the organic polymer chain 1 may be a "polyvinyl part" of polyvinylpolymethylsiloxane (PVPMS). PVPMS is a substance obtained through a hydrolysis reaction of a methoxy group, which is a hydrolyzable group in the PVMDMS, and a polycondensation reaction between side chains of the PVMDMS containing Si atoms. Thus, the PVPMS has an organic polymer chain 1 that is a vinyl polymer chain, and a polysiloxane chain 2 formed through a polycondensation reaction between side chains. The organic polymer chain 1 and the polysiloxane chain 2 in the PVPMS are in a state of being bonded to each other by covalent bonds at a plurality of positions on both chains with the Si atoms of the polysiloxane chain 2 as bonding points. In this case, the low-density gel product of the present disclosure can be a PVPMS low-density gel product having a skeleton composed of PVPMS. Similarly, since the organic polymer chain 1 and the polysiloxane chain 2 are bonded to each other by covalent bonds, the low-density gel product of the present disclosure may be a low-density gel product having a skeleton composed of a polymer having a name obtained by combining the name of the organic polymer chain 1 (polyvinyl in the above example) and the name of the polysiloxane chain 2 (polymethylsiloxane in the above example).

The repeating units of the organic polymer chain 1 of the PVPMS are repeating units represented by formula (2) ($R^4$ to $R^6$ are each a hydrogen atom, and a linking part L is not present). In addition, the polysiloxane chain 2 of the PVPMS is a polyorganosiloxane chain that has a methyl group as an organo group and that is composed of D units.

The degree of polymerization of the organic polymer chain 1 (which is the number of repeating units in the organic polymer chain 1 and may be the number of repeating units B) is, for example, 2 to 10000, and may be 10 to 1000, 20 to 100, or 40 to 80. When the degree of polymerization of the organic polymer chain 1 is in these ranges, high mechanical properties of the low-density gel product, including bending flexibility, can be more reliably obtained. When the degree of polymerization of the organic polymer chain 1 is excessively high, the density of the low-density gel product tends to rise, and the low density that is unique to a low-density gel product cannot be maintained in some cases. When the degree of polymerization of the organic polymer chain 1 is excessively low, high mechanical properties including bending flexibility cannot be obtained in some cases.

The weight-average molecular weight Mw of the organic polymer chain 1 is, for example, 100 to 100000, and may be 1000 to 20000 or 3000 to 10000. When the Mw of the organic polymer chain 1 is in these ranges, high mechanical properties of the low-density gel product, including bending flexibility, can be more reliably obtained. When the Mw of the organic polymer chain 1 is excessively high, the density of the low-density gel product tends to rise, and the low density that is unique to a low-density gel product cannot be maintained in some cases. When the Mw of the organic polymer chain 1 is excessively low, high mechanical properties including bending flexibility cannot be obtained in some cases.

The organic polymer chain 1 is preferably a polymer chain that has a degree of polymerization and/or Mw in the above-described range. The organic polymer chain 1 may be a dimer or an oligomer.

The organic polymer chain 1 can further have repeating units C that do not have an atom bonded to an Si atom of the polysiloxane chain 2. More specifically, the organic polymer chain 1 may be a copolymer chain of the repeating units C and repeating units each having an atom bonded to an Si atom of the polysiloxane chain 2, for example, the repeating units B. The repeating units C are each a unit that is copolymerizable with a repeating unit having an atom bonded to an Si atom of the polysiloxane chain 2, for example, with the repeating unit B.

The repeating units C are each, for example, an ethylene unit, a propylene unit, an oxyethylene unit, an oxypropylene unit, a (meth)acrylic acid unit, a (meth)acrylic acid ester unit, a vinylene chloride unit, or a styrene unit.

In the case where the organic polymer chain 1 further has the repeating units C, the content of the repeating units C in the organic polymer chain 1 may be, for example, 50% or less, as a proportion to the number of all the repeating units of the organic polymer chain 1, and may be 20% or less or 10% or less. When the proportion of the repeating units C is excessively high, the degree of bonding between the organic polymer chain 1 and the polysiloxane chain 2 decreases, and thus high mechanical properties including bending flexibility cannot be obtained in some cases.

The composition of the organic polymer chain 1 contained in the skeleton of the low-density gel product can be evaluated by analyzing the skeleton using various analysis methods such as Fourier transform infrared spectroscopy (FTIR), Raman spectroscopy, $^1$H-nuclear magnetic resonance (NMR), and $^{13}$C-NMR. In addition, the degree of polymerization of the organic polymer chain 1 can be evaluated by analyzing the skeleton using various analysis methods such as size exclusion chromatography (SEC).

The degree of polymerization of the polysiloxane chain 2, that is, the number of siloxane bonds (—Si—O—) contained in this chain, is not limited, but is, for example, 2 to 10000, and may be 2 to 1000 or 10 to 1000.

The polysiloxane chain 2 composed of D units is basically a linear chain. The polysiloxane chain 2 in which D units and T units and/or Q units are mixed can form a three-dimensional molecular network in which a portion where D units are continuous is a linear chain, and T units and/or Q units are branch points.

The organo groups bonded to the silicon atoms of the polysiloxane chain 2 that is a polyorganosiloxane chain are each, for example, an alkyl group, a hydride group, an amino propyl group, or a mercapto propyl group, preferably an alkyl group having 1 to 4 carbon atoms, more preferably a methyl group or an ethyl group, and particularly preferably a methyl group.

The content ratio of the organic polymer chain 1 and the polysiloxane chain 2 in the skeleton is not limited, but is, for example, 1 to 10 and may be 1 to 3 when represented by the ratio of the number of the repeating units, in the organic polymer chain 1, having atoms bonded to the Si atoms of the polysiloxane chain 2, for example, the number of the repeating units B in the organic polymer chain 1, to the number of the Si atoms of the polysiloxane chain 2.

The skeleton of the low-density gel product of the present disclosure may be an aggregate of nanoparticles containing the organic polymer chain 1 and the polysiloxane chain 2.

The skeleton diameter of the low-density gel product of the present disclosure is, for example, 100 nm or less, and may be 50 nm or less, 30 nm or less, or even 20 nm or less. The lower limit of the skeleton diameter is not limited, and the skeleton diameter is, for example, 1 nm or more, and may be 5 nm or more. The skeleton diameter is the diameter of a cross-section perpendicular to the direction in which the skeleton extends (for example, the diameter of an imaginary circle having an area equal to that of the cross-section). The skeleton diameter can be determined, for example by observation of the low-density gel product with an electron microscope.

The average skeleton diameter of the low-density gel product of the present disclosure is, for example, 1 to 100 nm, and may be 5 to 50 nm or 5 to 20 nm. When the average skeleton diameter is determined by observation with an electron microscope, at least ten evaluation points are provided for arbitrary locations on the skeleton of the low-density gel product that is an object to be evaluated, and the average of values evaluated at the respective evaluation points can be regarded as the average skeleton diameter of the low-density gel product.

The pore diameter of the low-density gel product of the present disclosure is, for example, 500 nm or less, and may be 100 nm or less, 60 nm or less, 50 nm or less, or even 20 nm or less. The lower limit of the pore diameter is not limited, and the pore diameter is, for example, 5 nm or more, and may be 10 nm or more. The pore diameter can be determined, for example, by observation of the low-density gel product with an electron microscope and/or porosimetry using a nitrogen adsorption method. The average pore diameter of the low-density gel product of the present disclosure is, for example, 5 to 500 nm, and may be 10 to 100 nm or 20 to 60 nm.

When the average pore diameter is determined by observation with an electron microscope, the diameters of at least ten arbitrary pores in the low-density gel product that is an object to be evaluated are evaluated, and the average of the diameters can be regarded as the average pore diameter of the low-density gel product.

The low-density gel product of the present disclosure may be a low-density gel product that does not have macropores. For example, the low-density gel product of the present disclosure that does not have macropores can be produced by setting a production condition that inhibits occurrence of macro-phase separation in which macropores can be formed, in a later-described production method. According to the study by the present inventors, in production of a silica-based low-density gel product by a sol-gel process, in a conventional method in which a mixture of a trifunctional silicon compound and a bifunctional silicon compound is used as a raw material compound, macro-phase separation in which large-size macropores that scatter visible light occurs, and thus high optical transparency that can be originally exhibited by a silica aerogel tends to be lost. In view of the fact that the low-density gel product of the present disclosure can be a low-density gel product that does not have macropores, the low-density gel product of the present disclosure is more advantageous than a low-density gel product obtained by the conventional method, in that high optical transparency can be more reliably exhibited.

The porosity of the low-density gel product of the present disclosure is, for example, 50% or more, and may be 60% or more, 70% or more, or even 80% or more, as a value measured with a laser confocal microscope. The upper limit of the porosity is not limited, but the porosity is, for example, 99% or less.

The low-density gel product of the present disclosure has high mechanical properties including bending flexibility and can also have at least one property selected from respective properties described below, depending on the structure of the low-density gel product. This is considered to be based on the fact that the low-density gel product of the present disclosure can have, for example, a more uniform structure by the above molecular structure, unlike a gel product obtained by simply mixing a polymer or a low-molecular-weight compound for improving mechanical properties. The low-density gel product further having the at least one property can be produced, for example, by controlling the production conditions in the later-described production method.

The low-density gel product of the present disclosure may also be a low-density gel product that has a skeleton containing a polysiloxane chain and an organic polymer chain and that has at least one of the above-described mechanical properties, particularly, at least one of the mechanical properties with respect to bending force, and at least one property selected from the respective properties described below.

Specific Surface Area (SSA)

The low-density gel product of the present disclosure can have a large specific surface area (SSA). The SSA is, for example, 500 $m^2/g$ or more, and can be 600 $m^2/g$ or more, or even 700 $m^2/g$ or more, depending on the structure of the low-density gel product. The upper limit of the SSA is not limited, and the SSA is, for example, 1500 $m^2/g$ or less, and can be 1000 $m^2/g$ or less. The SSA can be 700 to 1000 $m^2/g$, 800 to 1000 $m^2/g$, or even 900 to 1000 $m^2/g$. The low-density gel product having a large SSA is advantageous, for example, for use as adsorbents and catalysts.

Total Pore Volume

The low-density gel product of the present disclosure can have a large total pore volume. The total pore volume is, for example, 2 $cm^3/g$ or more, and can be 2.5 $cm^3/g$ or more, 3 $cm^3/g$ or more, 3.5 $cm^3/g$ or more, or even 4 $cm^3/g$ or more, depending on the structure of the low-density gel product. The upper limit of the total pore volume is not limited, and the total pore volume is, for example, 8 cm$^3$/g or less. The low-density gel product having a large total pore volume is advantageous, for example, for use as thermal insulators and catalysts.

Optical Transparency

The low-density gel product of the present disclosure can have a high visible light transmittance (transmittance with respect to light having a wavelength of 550 nm). The visible light transmittance is, for example, 60% or more, as a transmittance in a thickness direction when the low-density gel product is made into a sheet having a thickness of 2 mm, and can be 70% or more, 80% or more, 85% or more, or even 90% or more, depending on the structure of the low-density gel product. The upper limit of the visible light transmittance is not limited, and the visible light transmittance is, for example, 95% or less. The low-density gel product having a high visible light transmittance is advantageous, for example, for use as light-transmissive thermal insulators, optical catalyst carriers, and Cherenkov photodetectors. The light-transmissive thermal insulator can be used, for example, as an interlayer (thermal insulation layer) of insulated glazing.

Thermal Conductivity

The low-density gel product of the present disclosure can have a low thermal conductivity.

The thermal conductivity ($\lambda_{total}$) of a porous body is mainly composed of three components, that is, a solid conductivity ($\lambda_s$), a gas conductivity ($\lambda_g$), and a radiation conductivity ($\lambda_r$), and $\lambda_{total}$ is represented by the equation $\lambda_{total}=\lambda_s+\lambda_g+\Delta_r$. The low-density gel product of the present disclosure has, for example, a low density of 0.5 g/cm$^3$ or less and has a three-dimensional network structure with high uniformity between pores and a skeleton typically formed by aggregation of nanoparticles, and thus is considered to have low $\lambda_s$.

$\lambda_g$ is represented by the following equation.

$$\lambda_g = \varphi \times \lambda_g^0/(1+2\beta L_{mfp}P_0/[P \cdot D])$$

In the equation, φ is a porosity, $\lambda_g^0$ is the thermal conductivity (mW/(m·K)) of non-convective free gas molecules, ß is a constant unique to gas within a pore, $L_{mfp}$ is the mean free path (nm) of the gas molecules, $P_0$ is the pressure (Pa) of a reference gas, P is the pressure (Pa) of the gas, and D is the average pore diameter (nm) of the porous body. The average pore diameter of the low-density gel product of the present disclosure is, for example, 60 nm or less, and preferably less than 50 nm, and is smaller than the mean free path (about 70 nm) of main molecules in the environment, and thus $\lambda_g$ is reduced. There is little contribution of $\lambda_r$ to $\lambda_{total}$ at room temperature. Therefore, the low-density gel product of the present disclosure can exhibit a very low thermal conductivity ($\lambda_{total}$).

The thermal conductivity of the low-density gel product of the present disclosure is, for example, 25 mW/(m·K) or less, and can be 20 mW/(m·K) or less, or even 18 mW/(m·K) or less, depending on the structure of the low-density gel product. The lower limit of the thermal conductivity is not limited, and the thermal conductivity is, for example, 10 mW/(m·K) or more. The low-density gel product having a low thermal conductivity is advantageous, for example, for use as thermal insulators.

Water Repellency

The low-density gel product of the present disclosure can have high surface water repellency. The contact angle of water on the surface of the low-density gel product of the present disclosure is, for example, 120° or more, and can be 130° or more, 140° or more, or even 150° or more, depending on the structure of the low-density gel product. Water repellency with a contact angle of 150° or more is generally referred to as super water repellency. That is, the low-density gel product of the present disclosure can have super surface water repellency. The low-density gel product having high water repellency of the surface is advantageous, for example, for use as thermal insulators and antifouling materials.

The low-density gel product of the present disclosure has the polysiloxane chain 2, and, for example, in the case where the polysiloxane chain 2 contains D units, particularly, is composed of D units, the low-density gel product of the present disclosure can be a low-density gel product having a low —OH group content (hydroxyl group density). The low hydroxyl group density contributes to high water repellency of the low-density gel product. In addition, during drying of a wet gel when producing the gel product, irreversible shrinkage of the skeleton can be inhibited, whereby at least one property selected from a low density, a large SSA, a large total pore volume, high optical transparency, and a low thermal conductivity can be more reliably obtained. The low-density gel product having a low hydroxyl group density can be produced, for example, by controlling a condition for forming a wet gel by a sol-gel process, in the later-described production method, specifically, by adopting a reaction condition that promotes a polycondensation reaction. In addition, the low-density gel product having a low hydroxyl group density can also be produced by a modification treatment with a modifying agent that reacts with an —OH group.

The —OH group content (hydroxyl group density) of the low-density gel product of the present disclosure is, for example, 5/nm$^2$ or less, and may be 3/nm$^2$ or less, 2/nm$^2$ or less, or even 1/nm$^2$ or less, depending on the structure of the low-density gel product. The lower limit of the hydroxyl group content is, for example, 0.1/nm$^2$ or more, and may be 0.2/nm$^2$ or more. The hydroxyl group density of the low-density gel product can be evaluated, for example, by solid-state NMR or thermal analysis.

The shape of the low-density gel product of the present disclosure is not limited. The low-density gel product of the present disclosure can take various forms since the low-density gel product of the present disclosure can have high mechanical properties. The shape of the low-density gel product of the present disclosure is, for example, particles, sheets, or bulks such as a rectangular parallelepiped and a disc. That is, the low-density gel product of the present disclosure may be a monolithic body such as a sheet and a bulk. The low-density gel product that is a monolithic body is easily handled, as compared to a conventional particulate low-density gel product, also owing to it having high mechanical properties. In addition, the uniformity of properties can be improved as compared to that of a low-density gel product that has a specific shape by aggregating and shaping particles. Furthermore, the low-density gel product can be made into a large-size monolithic body, for example, a sheet having a large area or a sheet having a large thickness, owing to having high mechanical properties, and industrial production of the low-density gel product of the present disclosure can be considered, also owing to being able to employ a drying method with normal-pressure drying.

The shape of the low-density gel product of the present disclosure can be relatively easily changed by mechanical processing such as cutting and machining, on the basis of having high mechanical properties.

The application of the low-density gel product of the present disclosure is not limited. The low-density gel product of the present disclosure can be used for any application on the basis of various properties such as a low density (that is, light weight), high mechanical properties, a low thermal conductivity, and a high visible light transmittance. Specific applications are, for example, thermal insulators, adsorbents, catalysts, catalyst carriers, and Cherenkov photodetectors. In addition, the sheet-like low-density gel product can be used, for example, as an interlayer (thermal insulation layer) of insulated glazing.

The low-density gel product of the present disclosure having high bending flexibility can be used for applications based on the properties. A specific application is, for example, a thermal insulator that is wound around a transfer pipe for a refrigerant or a heating medium when used, on the basis of the fact that the low-density gel product of the present disclosure can be wound around a pipe or the like without being broken.

The low-density gel product of the present disclosure having high restorability with respect to compressive force and bending force can be considered to be used for applications in which deformation by these forces is repeatedly applied.

The low-density gel product of the present disclosure can be formed, for example, by the production method described below. The low-density gel product of the present disclosure may be a low-density gel product obtained by the following production method.

[Production Method for Low-Density Gel Product]

The production method of the present disclosure includes the following gelling step and drying step.

In the gelling step, in a solution system containing an organic precursor chain having repeating units A (the repeating units A each have, at a side chain, an Si atom to which two or more hydrolyzable functional groups D are bonded), a hydrolysis reaction of the functional groups D located at the side chains of the repeating units A and a polycondensation reaction between the side chains having the Si atoms are caused to proceed by a sol-gel process, and an organic polymer chain containing a main chain of the organic precursor chain, and a polysiloxane chain that contains the Si atoms and that is bonded to the organic polymer chain by covalent bonds at a plurality of positions, on the organic polymer chain, at which the side chains are bonded, are formed, and a wet gel including a skeleton phase that is rich in the polysiloxane chain and the organic polymer chain and a solution phase that is rich in a solvent of the solution system is formed.

In the drying step, the wet gel formed through the gelling step is dried, and with the skeleton phase as a skeleton and the solution phase as pores, a low-density gel product having the pores and the skeleton containing the polysiloxane chain and the organic polymer chain bonded to each other is obtained.

The low-density gel product of the present disclosure can be formed by this production method.

(Gelling Step)

The organic precursor chain has the repeating units A. The repeating units A each have an Si atom at a side chain. Two or more hydrolyzable functional groups D are bonded to the Si atom. The main chain of the organic precursor chain becomes the organic polymer chain contained in the skeleton phase of the wet gel, by the gelling step. In the case where a linking part that connects the main chain to the Si atom is present at the side chain of each repeating unit A, the linking part is contained in the organic polymer chain after the gelling step. The linking part is, for example, the linking part L in formulas (1) and (2). In addition, the organic polymer chain becomes the organic polymer chain 1 contained in the skeleton of the low-density gel product, through the drying step. The Si atoms and the functional groups D located at the side chains of the organic precursor chain are changed to the polysiloxane chain contained in the skeleton phase of the wet gel, through the hydrolysis reaction and the polycondensation reaction by the sol-gel process performed in the gelling step. The polysiloxane chain becomes the polysiloxane chain 2 contained in the skeleton of the low-density gel product, through the drying step. The organic polymer chain and the Si atoms forming the polysiloxane chain by the gelling step have a relationship between the main chain and the side chains of the organic precursor chain. Thus, the organic polymer chain and the polysiloxane chain contained in the skeleton phase of the wet gel after the gelling step and the skeleton of the low-density gel product are in a state of being bonded to each other by covalent bonds at a plurality of positions on both chains with the Si atoms as bonding points. The state of bonding between both chains can be the state described above in the explanation of the low-density gel product of the present disclosure.

The hydrolyzable functional groups are each, for example, an alkoxy group having 1 to 4 carbon atoms, and preferably a methoxy group or an ethoxy group since a stable hydrolysis reaction and polycondensation reaction can be caused to proceed.

An organo group may be further bonded to the Si atom at the side chain of each repeating unit A. In this case, the number of organo groups bonded to the Si atom may be one. In addition, in this case, in the gelling step, a polyorganosiloxane chain is formed as the polysiloxane chain. The organo group is as described above in the explanation of the low-density gel product of the present disclosure.

The repeating units A may each be a unit with which the organic polymer chain after the gelling step is an aliphatic hydrocarbon chain. The aliphatic hydrocarbon chain may contain at least one type of atom selected from an oxygen atom, a nitrogen atom, a sulfur atom, and a halogen atom, in addition to a carbon atom and a hydrogen atom. The aliphatic hydrocarbon chain may be a vinyl polymer chain, a vinylidene polymer chain, an allyl polymer chain, or a (meth)acrylic polymer chain.

The repeating units A are each, for example, a unit represented by the following formula (1).

[Chem. 2]

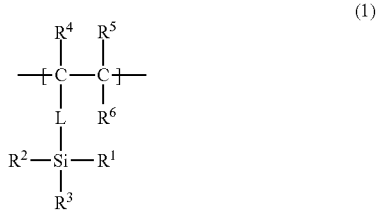

(1)

$R^1$ in formula (1) is a functional group D or an organo group, and, more specifically, may be an alkoxy group having 1 to 4 carbon atoms or an alkyl group having 1 to 4 carbon atoms, or may be a methoxy group, an ethoxy group, or a methyl group. $R^2$ and $R^3$ are each a functional group D, and, more specifically, may each be independently an alkoxy group having 1 to 4 carbon atoms, or may each be independently a methoxy group or an ethoxy group.

$R^4$ to $R^6$ and a linking part L are the same as $R^4$ to $R^6$ and the linking part L in the above-described formula (2). In the case where a linking part L is not present, this location is a single bond, and the Si atom at the side chain is bonded to a carbon atom of the main chain of the repeating units A.

In the case where $R^4$ to $R^6$ are each a hydrogen atom, the repeating unit A of formula (1) is a vinyl monomer unit. In this case, an organic polymer chain that is a vinyl polymer chain that can contain a linking part L can be formed by the gelling step.

In the case where $R^4$ is a group other than a hydrogen atom, and $R^5$ and $R^6$ are each a hydrogen atom, the repeating unit A of formula (1) is a vinylidene monomer unit. In this case, an organic polymer chain that is a vinylidene polymer chain that can contain a linking part L can be formed by the gelling step.

In the case where any one group of $R^4$ to $R^6$ is a methyl group, and the remaining two groups are each a hydrogen atom, the repeating unit A of formula (1) is an allyl monomer unit. In this case, an organic polymer chain that is an allyl polymer chain that can contain a linking part L can be formed by the gelling step. Moreover, in the case where $R^4$ to $R^6$ are each a hydrogen atom, and the linking part L is a methylene group, the repeating unit A of formula (1) is also an allyl monomer unit. An example of the allyl monomer unit is an allylmethyldimethoxysilane unit, an allylmethyldiethoxysilane unit, an allyltrimethoxysilane unit, or an allyltriethoxysilane unit.

In the case where $R^4$ is a hydrogen atom, $R^5$ is a hydrogen atom or a methyl group, and $R^6$ is a carboxyl group or a carboxyl ester group (—COOR$^7$), the repeating unit A of formula (1) is a (meth)acrylic monomer unit. In this case, an organic polymer chain that is a (meth)acrylic polymer chain that can contain a linking part L can be formed by the gelling step. Moreover, in the case where the linking part L has a carboxy ester group bonded to a carbon atom of the main chain, for example, in the case where the linking part L is a (meth)acryloxypropyl group, the repeating unit A of formula (1) is also a (meth)acrylic monomer unit. An example of the (meth)acrylic monomer unit is a (meth)acryloxypropylmethyldimethoxysilane unit, a (meth)acryloxypropylmethyldiethoxysilane unit, a (meth)acryloxypropyltrimethoxysilane unit, or a (meth)acryloxypropyltriethoxysilane unit.

Specific examples of the organic precursor chain include polyvinylmethyldimethoxysilane (PVMDMS), polyvinylmethyldiethoxysilane, polyallylmethyldimethoxysilane, polyallylmethydiethoxysilane, poly(meth)acryloxypropylmethydimethoxysilane, poly(meth)acryloxypropylmethydiethoxysilane, poly-p-styrylmethyldimethoxysilane, poly-p-styrylmethydiethoxysilane, polyvinyltrimethoxysilane, polyvinyltriethoxysilane, polyallyltrimethoxysilane, polyallyltriethoxysilane, poly(meth)acryloxypropyltrimethoxysilane, poly(meth)acryloxypropyltriethoxysilane, poly-p-styryltrimethoxysilane, and poly-p-styryltriethoxysilane.

The degree of polymerization of the repeating units A in the organic precursor chain can be in the same range as that of the degree of polymerization of the organic polymer chain described above in the explanation of the low-density gel product of the present disclosure. That is, the degree of polymerization of the repeating units A in the organic precursor chain is, for example, 2 to 10000, and may be 10 to 1000, 20 to 100, or 40 to 80.

The weight-average molecular weight Mw of the organic precursor chain is, for example, 100 to 100000, and may be 1000 to 20000 or 3000 to 10000.

The organic precursor chain may have units other than the repeating units A. The units other than the repeating units A are, for example, the repeating units C described above in the explanation of the low-density gel product of the present disclosure. In the case where the organic precursor chain further has the repeating units C, the content of the repeating units C in the organic precursor chain can be equal to the content of the repeating unit C in the organic polymer chain 1 described above in the explanation of the low-density gel product of the present disclosure.

The content of the organic precursor chain in the solution system is, for example, 1 to 60 mass %, and may be 5 to 50 mass %, or 10 to 40 mass %.

The solvent of the solution system is not limited as long as progress of the hydrolysis reaction and the polycondensation reaction for the organic precursor chain is possible. The solvent is, for example, water, methanol, ethanol, 2-propanol, benzyl alcohol, formamide, N,N-dimethylformamide, dimethyl sulfoxide, or the like, and may be a mixed solvent thereof. The solvent is preferably water, benzyl alcohol, or a mixed solvent thereof. The solvent may be a polar solvent or may contain a nonpolar solvent together with a polar solvent. The solution system may be aqueous.

The solution system may contain a catalyst for promoting the hydrolysis reaction and the polycondensation reaction. The catalyst is not limited. The catalyst may be an acid catalyst or a basic catalyst, but the use of the basic catalyst can further promote the hydrolysis reaction and the polycondensation reaction. From this viewpoint, the solution system can further contain a basic catalyst. The acid catalyst and the basic catalyst each mean a catalyst that changes the pH of the solution by releasing hydrogen ions or hydroxide ions and promotes the hydrolysis reaction and the polycondensation reaction.

Examples of the acid catalyst include: inorganic acids such as hydrochloric acid, nitric acid, and sulfuric acid; and organic acids such as formic acid, acetic acid, and oxalic acid, and inorganic acids are preferable since more stable progress of the hydrolysis reaction and the polycondensation reaction is possible. Examples of the basic catalyst include quaternary ammonium hydroxides, quaternary ammonium salts, ammonia, sodium hydroxide, potassium hydroxide, and urea, and quaternary ammonium hydroxides are preferable since more stable progress of the hydrolysis reaction and the polycondensation reaction is possible and these reactions can be further promoted. Examples of quaternary ammonium hydroxides include tetramethylammonium hydroxide (TMAOH), tetraethylammonium hydroxide, and tetrapropylammonium hydroxide. Examples of quaternary ammonium salts include bis(tetramethylammonium) carbonate (TMACO), bis(tetraethylammonium) carbonate, and bis(tetrapropylammonium) carbonate. The basic catalyst is preferably TMAOH or TMACO. TMAOH has a higher basicity than TMACO.

The content of the catalyst in the solution system is, for example, 0.1 to 30 mass %, and may be 0.5 to 20 mass % or 1 to 10 mass %.

The solution system can contain another substance as long as the low-density gel product of the present disclosure is obtained.

The other substance is, for example, a phase separation inhibitor. The phase separation inhibitor has an action of inhibiting macro-phase separation between the skeleton phase and the solution phase during wet gel formation. The phase separation inhibitor is, for example, a substance having affinity for both a polar solvent and a polycondensation reaction composition which is basically hydrophobic. More specific examples of the phase separation inhibitor include halogenated quaternary ammonium salts having 2 or more carbon atoms, and block copolymers. The phase separation inhibitor may be n-hexadecyl trimethyl chloride, n-hexadecyl trimethyl bromide, polyethylene oxide-block-polypropylene oxide-block-polyethylene oxide, or a polyoxyethylene alkyl ether having 2 or more carbon atoms.

Another example of the other substance is a silicon compound with which, in the gelling step, the hydrolysis reaction and the polycondensation reaction by the sol-gel process can proceed between the Si atoms at the side chains of the repeating units A of the organic precursor chain. Examples of the silicon compound include tetramethoxysilane (TMOS), tetraethoxysilane, methyltrimethoxysilane, methyltriethoxysilane, ethyltrimethoxysilane, and ethyltriethoxysilane.

The hydrolysis reaction and the polycondensation reaction in the sol-gel process continuously proceed. The reaction temperature is, for example, 0 to 120° C., and may be 60 to 100° C. The reaction time depends on the composition of the reaction system, but is, for example, 1 to 120 hours, and may be 1 to 72 hours.

In the gelling step, an aging period may be provided for the purpose of improving the reaction rate of the polycondensation reaction. By providing the aging period, the amount (hydroxyl group density) of —OH group bonded to the Si atoms in the polysiloxane chain can be reduced. By reducing the amount of —OH groups contained in the wet gel, reaction between —OH groups in the case where normal-pressure drying is selected in the drying step is inhibited, and thus irreversible shrinkage of the low-density gel product can be inhibited. In addition, by reducing the amount of —OH groups contained in the wet gel, the hydrophobicity of the surface of the finally obtained low-density gel product can be improved. The hydrophobicity of the surface can be evaluated on the basis of a contact angle of water. The aging temperature is, for example, 0 to 120° C., and may be 60 to 100° C. The aging time is, for example, 24 to 120 hours, and may be 48 to 72 hours.

In the gelling step, a modification treatment for reducing the amount of —OH groups may be performed on the wet gel formed through the hydrolysis reaction and the polycondensation reaction. This treatment can be performed, for example, by bringing a modifying agent that binds to an —OH group, into contact with the wet gel. Examples of the modifying agent include hexamethyldisiloxane (HMDS), trimethylchlorosilane, dimethyldichlorosilane, and methyltrichlorosilane. When HMDS is used, an —OH group is converted to an —O—Si(CH$_3$)$_3$ group. The treatment can be performed by bringing a solution containing the modifying agent into contact with the wet gel by means of a technique such as coating, spraying, or clipping. The treatment temperature is, for example, 0 to 100° C., and the treatment time is, for example, 1 to 48 hours.

The method for forming the organic precursor chain is not limited. The organic precursor chain can be formed, for example, by causing polymerization with a polymerizable group to proceed on a silicon compound that has an Si atom to which two or more functional groups D are bonded and that further has the polymerizable group. That is, the production method of the present disclosure may further include, in addition to the gelling step and the drying step, a precursor forming step of causing polymerization with a polymerizable group to proceed on a silicon compound that has an Si atom to which two or more functional groups D are bonded and that further has the polymerizable group, to form an organic precursor chain having repeating units A derived from the silicon compound, before the gelling step.

The polymerizable group is not limited, and is, for example, a polymerizable group with which an aliphatic hydrocarbon chain is formed by polymerization. More specifically, the polymerizable group may be at least one group selected from a vinyl group, a vinylidene group, an allyl group, and a (meth)acrylic group.

The silicon compound is, for example, a compound represented by the following formula (3).

[Chem. 3]

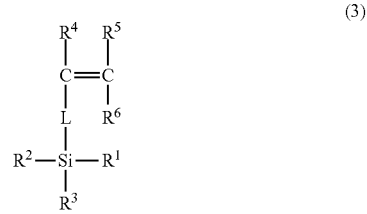

(3)

$R^1$ to $R^6$ and L in formula (3) are the same as $R^1$ to $R^6$ and L in formula (1).

Specific examples of the silicon compound include vinylmethyldimethoxysilane, vinylmethyldiethoxysilane, allylmethyldimethoxysilane, allylmethyldiethoxysilane, (meth)acryloxypropylmethyldimethoxysilane, (meth)acryloxypropylmethyldiethoxysilane, p-styrylmethyldimethoxysilane, p-styrylmethyldiethoxysilane, vinyltrimethoxysilane, vinyltriethoxysilane, allyltrimethoxysilane, allyltriethoxysilane, (meth)acryloxypropyltrimethoxysilane, (meth)acryloxypropyltriethoxysilane, p-styryltrimethoxysilane, and p-styryltriethoxysilane.

The silicon compound may have an Si atom to which an organo group and two functional groups D are bonded, and further have a polymerizable group. This silicon compound is a bifunctional silicon compound.

The polymerization process for the silicon compound in the precursor forming step can be selected on the basis of the type of the polymerizable group, and, for example, radical polymerization can be selected.

Radical polymerization can be performed by any polymerization method such as solution polymerization, bulk polymerization, emulsion polymerization, and suspension polymerization. By selecting solution polymerization or bulk polymerization, the precursor forming step and the gelling step can be continuously performed. The fact that both steps can be continuously performed is advantageous for industrial production of the low-density gel product of the present disclosure. Moreover, as is obvious from the above description and the examples described later, with the production method of the present disclosure, it is possible to obtain the low-density gel product using a single silicon compound, for example, a bifunctional silicon compound as a starting material. This is also advantageous for industrial production of the low-density gel product of the present disclosure.

The polymerization system in the precursor forming step may contain a substance other than the silicon compound as long as the organic precursor chain is obtained. Examples of the substance include a radical initiator, an anionic initiator, and a cationic initiator.

The radical initiator is not limited, and may be a peroxide initiator, an azo initiator, or a redox initiator. Examples of the peroxide polymerization initiator include di-tert-butyl peroxide, tert-butyl hydroperoxide, benzoyl peroxide, and methyl ethyl ketone peroxide.

The content of the polymerization initiator in the polymerization system is, for example, 0.1 to 10 mass %, and may be 1 to 10 mass %.

In the case where radical polymerization is performed by solution polymerization, the solvent of the polymerization system is, for example, benzene, toluene, xylene, methanol, ethanol, N,N-dimethylformamide, or a mixed solvent thereof. The solvent in the polymerization system in the precursor forming step and the solvent in the solution system in the gelling step may be the same.

The polymerization temperature is, for example, 0 to 250° C., and may be 100 to 200° C. The polymerization time is, for example, 1 to 72 hours, and may be 12 to 48 hours.

It is possible to control the properties of the low-density gel product obtained through the drying step, on the basis of the conditions of the gelling step. Examples of control based on the conditions of the gelling step will be described.

In the case where the precursor forming step and the gelling step are continuously performed, by increasing the polymerization rate in the precursor forming step and reducing the amount of unreacted silicon compound remaining, the uniformity of gelation in the gelling step can be improved, and occurrence of macro-phase separation can also be inhibited. Due to the improvement in the uniformity of gelation and/or inhibition of macro-phase separation, for example, the visible light transmittance of the low-density gel product tends to improve, the specific surface area (SSA) of the low-density gel product tends to increase, and the pore diameter and the skeleton diameter of the low-density gel product tend to decrease. The polymerization rate of the silicon compound in the precursor forming step can be improved, for example, by control of the polymerization time, the polymerization temperature, the type of the polymerization initiator, the content of the polymerization initiator in the polymerization system, etc. In the low-density gel product of the present disclosure, a transparent color tone with a slight bluishness may appear due to Rayleigh scattering that occurs as a result of a reduction in the size of the nanoparticles forming the skeleton due to the improvement in the uniformity of gelation.

In the case where a catalyst is used in the gelling step, by increasing the basicity of the catalyst, the polycondensation reaction can be caused to proceed faster, whereby occurrence of macro-phase separation in the gelling step can be inhibited. In addition, in the case where an aging period is provided, when the basicity of the catalyst is higher, the reaction rate of the polycondensation reaction can be further improved, and the amount of —OH groups remaining in the wet gel and the low-density gel product can be further reduced. The effects achieved by inhibiting macro-phase separation and reducing the amount of —OH groups are as described above.

By decreasing the content of the organic precursor chain in the solution system in the gelling step, the specific surface area (SSA) of the finally obtained low-density gel product can be increased, and the bulk density of the finally obtained low-density gel product can be decreased. In this case, the pore diameter, the pore diameter distribution, and the skeleton diameter of the low-density gel product tend to increase, whereby the visible light transmittance of the low-density gel product tends to decrease. In other words, by increasing the content of the organic precursor chain in the solution system, the pore diameter, the pore diameter distribution, and the skeleton diameter of the low-density gel product can be decreased, and, for example, the visible light transmittance of the gel product can be improved.

The effects achieved by providing an aging period and performing a modification treatment for reducing the amount of —OH groups on the wet gel are as described above.

(Drying Step)

In the drying step, the wet gel formed through the gelling step is dried to obtain a low-density gel product with the skeleton phase of the wet gel as a skeleton and the solution phase as pores.

For drying the wet gel, a known drying method for obtaining a low-density gel product can be used. Examples of the drying method include supercritical drying, normal-pressure drying, and freeze-drying. In general, a low-density gel product obtained by performing supercritical drying on a wet gel is referred to as an aerogel, a low-density gel product obtained by performing normal-pressure drying on a wet gel is referred to as a xerogel, and a low-density gel product obtained by performing freeze-drying on a wet gel is referred to as a cryogel.

For supercritical drying, for example, carbon dioxide fluid, methanol fluid, and water fluid can be used as fluid in a supercritical state. The use of carbon dioxide fluid is preferable since it is easy to perform supercritical drying. Before performing supercritical drying, solvent replacement of the wet gel may be performed.

Since the low-density gel product of the present disclosure has high mechanical properties, the low-density gel product of the present disclosure can be obtained as a xerogel by normal-pressure drying. The temperature of normal-pressure drying is not limited, and is, for example, 20 to 80° C., and may be 40 to 60° C. Before performing normal-pressure drying, solvent replacement in which the solvent contained in the gel is replaced with a solvent having a low boiling point may be performed. Accordingly, normal-pressure drying can be more reliably performed.

The gelling step and the drying step can be continuously performed.

The production method of the present disclosure can include an arbitrary step other than those described above, as long as the low-density gel product is obtained. The step is, for example, a washing step.

As is obvious from the above description, with the production method of the present disclosure, the degree of freedom in the shape of a low-density gel product to be formed can be increased. Thus, with the production method of the present disclosure, without being limited to a film, a low-density gel product can be formed as a molded body having a higher degree of freedom in shape. The molded body can be, for example, a monolithic body. In addition, the shape of the formed low-density gel product can be relatively easily changed by mechanical processing such as cutting and machining on the basis of its high mechanical properties.

EXAMPLES

Hereinafter, the present invention will be described in more detail by way of examples. The present invention is not limited to the examples described below.

[Compound Names]

In the present examples, the following abbreviations are used as compound names and polymer names.

VMDMS: vinylmethyldimethoxysilane
DTBP: di-tert-butyl peroxide
PVMDMS: polyvinylmethyldimethoxysilane
BzOH: benzyl alcohol
TMAOH: tetramethylammonium hydroxide
TMACO: bis(tetramethylammonium) carbonate
PVPMS: polyvinylpolymethylsiloxane
HMDS: hexamethyldisiloxane

[Preparation of Materials]

As distilled water, one manufactured by Hayashi Pure Chemical Ind., Ltd. was prepared. As DTBP, one manufactured by Tokyo Chemical Industry Co., Ltd. was prepared. As VMDMS, TMAOH (aqueous solution with a concentration of 25 mass %), and HMDS, those manufactured by Sigma-Aldrich Co. LLC. were prepared. As BzOH, 2-propanol, and n-hexane, those manufactured by KISHIDA CHEMICAL Co., Ltd. were prepared. TMACO (aqueous solution with a concentration of 25 mass %) was obtained by reacting TMAOH with carbon dioxide. Specifically, excess carbon dioxide was bubbled into 10 mL of TMAOH to cause a reaction of TMAOH with carbon dioxide (a reaction that forms tetramethylammonium bicarbonate (TMABC)) to completely proceed. Next, the obtained TMABC and 10 mL of TMAOH were mixed to obtain TMACO.

[Evaluation Method for Produced PVMDMS]

Respective properties of PVMDMSs produced in the examples were evaluated as described below.

<Weight-Average Molecular Weight Mw and Molecular Weight Distribution Mw/Mn>

Mw and Mw/Mn (Mn: number average molecular weight) of PVMDMS were evaluated by gel filtration chromatography (GPC). Shodex GPC104 was used as a GPC system, Shodex LF604 was used as a column, and chloroform was used as a developing solvent.

<Polymerization Rate>

The polymerization rate (conversion) of PVMDMS from VMDMS was evaluated by $^1$H-NMR measurement. Avance III manufactured by Bruker was used as an NMR apparatus, and the reference frequency was set to 400 MHz.

[Evaluation Method for Produced Low-Density Gel Products]

Respective properties of low-density gel products produced in the examples were evaluated as described below.

<Density>

The bulk density of the low-density gel product was determined from the diameter, the height, and the weight of a cylindrical sample. The true density (skeleton density) of the low-density gel product was evaluated by helium pycnometry.

<Total Pore Volume>

The total pore volume of the low-density gel product was calculated from the above determined bulk density and true density.

<Visible Light Transmittance>

The visible light transmittance of the low-density gel product was evaluated with a UV-visible/NIR spectrophotometer equipped with an integrating sphere (V-670, manufactured by JASCO Corporation).

<Functional Groups on Surface>

The functional groups on the surface of the low-density gel product were identified by Fourier transform infrared spectroscopy (FTIR). IR Affinity-1 manufactured by SHIMADZU CORPORATION was used as an FTIR measuring apparatus.

<Form of Pores>

The form of pores in the low-density gel product was evaluated with a field emission scanning electron microscope (FESEM). JSM-6700F manufactured by JEOL Ltd. was used as the FESEM.

<Adsorption/Desorption Isotherm, Specific Surface Area, and Pore Diameter Distribution>

The adsorption/desorption isotherm, the specific surface area (SSA), and the pore diameter distribution of the low-density gel product were evaluated by nitrogen adsorption analysis. As an evaluation apparatus, BELSORP-mini manufactured by MicrotracBEL Corporation was used. Prior to nitrogen adsorption/desorption measurement, a sample was degassed under a vacuum at 120° C. for approximately 6 hours. The SSA was determined from the adsorption branch using the Brunauer-Emmett-Teller (BET) method. The pore diameter distribution was determined from the adsorption branch using the Barrett-Joyner-Halenda (BJH) method.

<Uniaxial Compression Test and Three-Point Flexural Test>

A uniaxial compression test and a three-point flexural test for the low-density gel product were performed using a compression/tensile tester (EZ Graph, manufactured by SHIMADZU CORPORATION).

In the uniaxial compression test, the shape of a sample was a cylinder having a diameter of 10 to 13 mm and a height of 5 to 10 mm. The direction of the compression axis in the test was the height direction of the cylinder. A compression plate that fully covered the upper surface of the sample was used such that pressure was uniformly applied to the upper surface during compression of the sample. The compression speed was set to 0.5 mm/min.

In the three-point flexural test, the shape of a sample was a rectangular parallelepiped having a width of 10 mm, a length of 50 mm, and a thickness of 1 mm. The length of the support span was set to 25 mm. The sample was placed on supports such that that a central portion of the sample in the length direction was located at the midpoint of the support span. The three-point flexural test was carried out with the central portion as a load point by pressing an indenter having a tip radius of 0.3 mm against the load point. The test speed was set to 0.5 mm/min.

<Contact Angle>

The contact angle of water on the surface of the low-density gel product was evaluated using a contact angle meter (DM-561Hi, manufactured by Kyowa Interface Science Co., Ltd.). The volume of a water droplet used for the evaluation was set to 3 μL.

<Thermal Stability>

The thermal stability of the low-density gel product was evaluated in air using a differential thermogravimetric (TG-DTA) apparatus (Thermo plus EVO TG8120, manufactured by Rigaku Corporation) at a temperature rise rate of 5° C./min.

<$^{29}$Si-NMR>

$^{29}$Si-NMR for the low-density gel product was performed by the cross polarization magic angle spinning (CP-MAS) method. Avence III 800US manufactured by Bruker was used as an NMR apparatus, and the static magnetic field was set at 18.8 T. The probe was set to 4 mm, and the MAS rotation frequency was set to 12 kHz using hexamethylcyclotrisiloxane as an external reference material.

<Thermal Conductivity>

The thermal conductivity at room temperature of the low-density gel product was evaluated using a heat flow meter (HFM 436 Lambda, manufactured by NETZSCH under an environment having normal temperature and atmospheric pressure. A sample was a rectangular parallelepiped having a width of 10 mm, a length of 10 mm, and a thickness of 1 mm.

[Production of Low-Density Gel Product]

Figure 2:
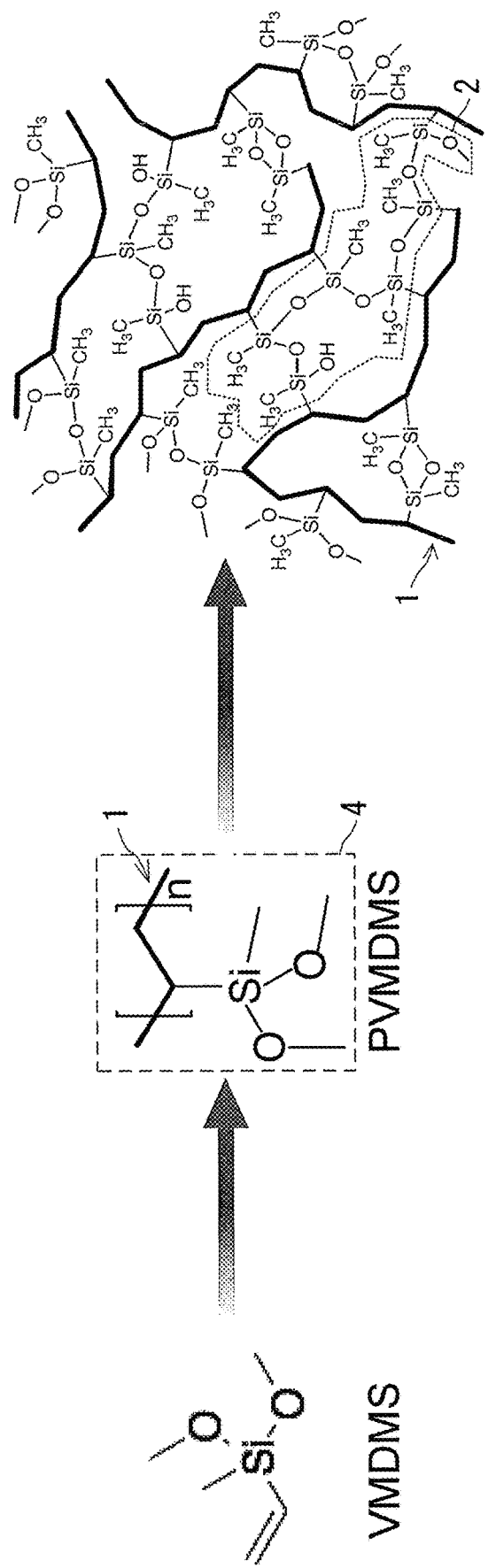
FIG. 2 is a diagram schematically showing steps, for producing a low-density gel product from a bifunctional silicon compound, performed in examples.

In the present examples, VMDMS was used as a bifunctional silicon compound, a PVMDMS that is an organic precursor chain was formed from VMDMS, and a PVPMS low-density gel product was produced by the process shown in FIG. 2. The repeating units A of the PVMDMS are each a unit indicated by reference character 4 in FIG. 2.

<Polymerization of PVMDMS from VMDMS>

VMDMS, and DTBP, as a reaction initiator, the content of which in the polymerization system was adjusted to 1 or 5 mol %, were put in a hot water reactor. Next, after the gas in the reactor was replaced with argon gas, the reactor was sealed. Next, the reactor was heated to 120° C. and maintained for a predetermined reaction time (6, 12, 24, 48, or 72 hours), thereby allowing radical bulk polymerization of VMDMS to proceed. After the reaction time elapsed, the reaction solution was naturally cooled at room temperature to obtain a transparent and viscous liquid containing PVMDMS as a main component.

<Production of Low-Density Gel Product>

BzOH, distilled water, and TMAOH or TMACO as a basic catalyst were added to 1 mL of the liquid obtained as described above, in the amounts shown in Table 2 described later, in this order while being stirred. After all the materials were added, the sol obtained by further stirring for 5 minutes was transferred to a glass bottle, and the bottle was sealed and placed in a heating furnace set at 80° C. for 1 hour to allow a sol-gel reaction to proceed. Next, the wet gel formed by the reaction was aged at 80° C. or 100° C. for 4 days, and then subjected to solvent replacement with 2-propanol at a temperature of 60° C. for 2 days to remove the residual compounds.

Thereafter, the wet gel was subjected to supercritical drying or normal-pressure drying to obtain a PVPMS aerogel (supercritical drying) or xerogel (normal-pressure drying). The supercritical drying was performed using carbon dioxide fluid under conditions of 80° C. and 13.5 MPa. Regarding the normal-pressure drying, in the case of not performing a modification treatment with HMDS, the wet gel was subjected to solvent replacement with n-hexane three times at a temperature of 50° C. (8 hours each time), and the normal-pressure drying was subsequently performed at room temperature for 2 days and then at 80° C. for 1 day as drying conditions. In the case of performing a modification treatment with HMDS, the wet gel was treated with HMDS at 50° C. for 2 days, and then subjected to solvent replacement with n-hexane three times at a temperature of 50° C. (8 hours each time), and, the normal-pressure drying was subsequently performed at room temperature for 2 days and then at 80° C. for 1 day as drying conditions. The amount of HMDS used in the treatment was doubled in volume with respect to VMDMS, which is the starting material. Similar results were obtained even when solvent replacement was performed using 2-propanol instead of n-hexane.

Table 1 below shows the evaluation results of the PVMDMSs (Production Examples 1 to 10) obtained by radical polymerization of VMDMS.

TABLE 1

|  | DTBP concentration (mol %) | Polymerization time (hour) | Mw | Degree of polymerization | Mw/Mn | Reaction rate (%) |
| --- | --- | --- | --- | --- | --- | --- |
| Production Example 1 | 1 | 6 | — | — | — | — |
| Production Example 2 | 1 | 12 | — | — | — | — |
| Production Example 3 | 1 | 24 | 5358 | 40.5 | 1.86 | 91 |
| Production Example 4 | 1 | 48 | 5356 | 40.5 | 1.86 | 95 |
| Production Example 5 | 1 | 72 | 6038 | 45.7 | 2.09 | 99 |
| Production Example 6 | 5 | 6 | — | — | — | — |
| Production Example 7 | 5 | 12 | — | — | — | — |
| Production Example 8 | 5 | 24 | — | — | — | — |
| Production Example 9 | 5 | 48 | — | — | — | — |
| Production Example 10 | 5 | 72 | — | — | — | — |

* "—" indicates no measurement.

As shown in Table 1, when the concentration of DTBP in the polymerization system was fixed at 1 mol %, the degrees of polymerization of the obtained PVMDMSs were 40.5, 40.5, and 45.7 for polymerization times of 24, 48, and 72 hours, respectively. The polymerization rates from VMDMS to PVMDMS were 91%, 95%, and 99%, respectively. As the polymerization time became longer, the degree of polymerization increased and the polymerization rate further improved.

Table 2 and Table 3 below show the starting composition when producing a low-density gel product by the gelling step and the properties of the obtained PVPMS low-density gel products.

The sample names of the low-density gel products in the present examples follow the rules described below. Regarding S and A at the heads of the sample names, S means an aerogel obtained by supercritical drying, and A means a xerogel obtained by normal-pressure drying. The second character H means a gel obtained using TMAOH as the catalyst in the gelling step, and the second character C means a gel obtained using TMACO as the catalyst in the gelling step. The third character "1" means that the concentration of DTBP used when polymerizing PVMDMS from VMDMS is 1 mol %, and the third character "5" means that this concentration is 5 mol %. The number following a hyphen means the VMDMS polymerization time. The numbers "1", "2", and "3" following a hyphen again mean that the molar ratios of BzOH to silicon atom in PVMDMS are 4.3, 5.0, and 5.7, respectively. Among the samples, there are samples in which M or the numeral "100" is further added, and these samples each mean a sample for which the wet gel was treated with HMDS or a sample for which the aging temperature was 100° C. The aging temperature of samples having sample names in which the number "100" is not included was 80° C.

Figure 3:
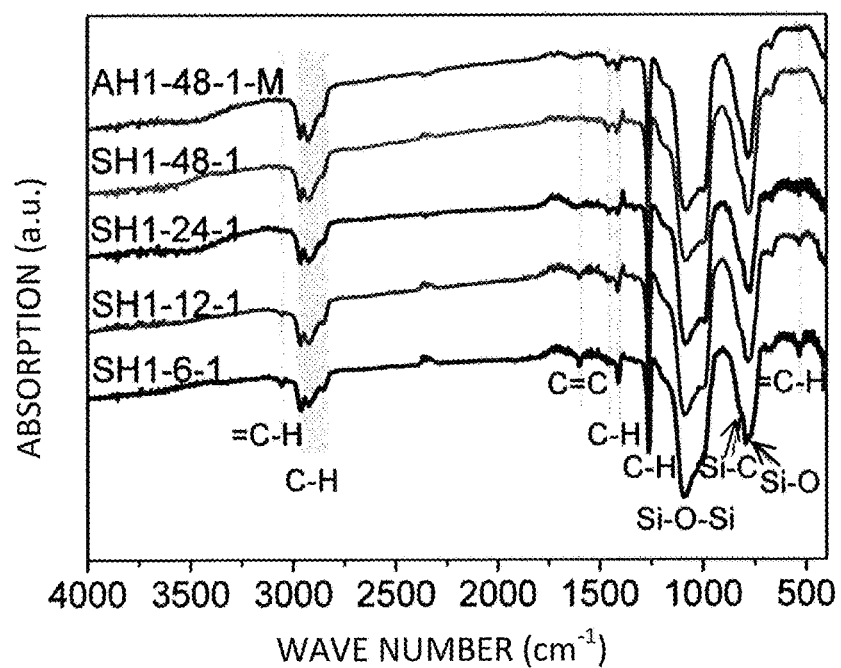
FIG. 3 is a graph showing evaluation results of Fourier transform infrared spectroscopy (FTIR) for low-density gel products (aerogels and xerogels) produced in the examples.

As shown in FTIR spectra in FIG. 3, as the polymerization time became longer, the amount of vinyl group remaining in the low-density gel product decreased. In the FTIR spectra, absorption at a wave number of 3056 cm$^{-1}$ corresponds to =C—H stretching vibration, absorption at a wave number of 1600 cm$^{-1}$ corresponds to C=C stretching vibration, absorption at a wave number of 1406 cm$^{-1}$ corresponds to =CH2 symmetric in-plane bending (scissoring) (overlapping with —CH deformation), and absorption at a wave number of 532 cm$^{-1}$ corresponds to =CH bending. For example, regarding sample SH1-24-1 (polymerization time: 24 hours), the absorption corresponding to vinyl group identified by the FTIR spectrum was very weak, and, regarding sample SH1-48-1 (polymerization time: 48 hours), vinyl group absorption was not observed. Moreover, according to $^{29}$Si-NMR in FIG. 4, a peak of silicon ($CH_2$=$CH(CH_3)SiO_{2/2}$) bonded with a vinyl group was observed around a chemical shift of −35 ppm for sample SH1-24-1, but such a peak was not observed for sample SH1-48-1. This result corresponded to the different polymerization rates of PVMDMS in these two types of samples.

TABLE 2

| Sample | DTBP (mol %) | Polymerization time (hour) | BzOH/Si (mol/mol) | $H_2O$/Si (mol/mol) | TMAOH/Si (mol/mol) | TMACO/Si (mol/mol) |
|---|---|---|---|---|---|---|
| SH1-24-1 | 1 | 24 | 4.3 | 2.0 | 0.030 | — |
| SH1-48-1 | 1 | 48 | 4.3 | 2.0 | 0.030 | — |
| AH1-48-1 | 1 | 48 | 4.3 | 2.0 | 0.030 | — |
| AH1-48-1-M | 1 | 48 | 4.3 | 2.0 | 0.030 | — |
| AH1-48-1-100 | 1 | 48 | 4.3 | 2.0 | 0.030 | — |
| SH1-48-2 | 1 | 48 | 5.0 | 1.6 | 0.052 | — |
| AH1-48-2-100 | 1 | 48 | 5.0 | 2.0 | 0.045 | — |
| SH1-48-3 | 1 | 48 | 5.7 | 1.6 | 0.067 | — |
| SC1-48-1 | 1 | 48 | 4.3 | 2.0 | — | 0.030 |
| AC1-48-1 | 1 | 48 | 4.3 | 2.0 | — | 0.030 |
| AC1-48-1-M | 1 | 48 | 4.3 | 2.0 | — | 0.030 |
| SC1-48-2 | 1 | 48 | 5.0 | 2.0 | — | 0.052 |
| SH1-6-1 | 1 | 6 | 4.3 | 2.0 | 0.030 | — |
| SH1-12-1 | 1 | 12 | 4.3 | 2.0 | 0.030 | — |
| SH1-72-1 | 1 | 72 | 4.3 | 2.0 | 0.030 | — |
| SH5-48-1 | 5 | 48 | 4.3 | 2.0 | 0.030 | — |

TABLE 3

| Sample | Bulk density (g/cm$^3$) | SSA (BET) (m$^2$/g) | Average hole diameter (nm) | Total pore volume (cm$^3$/g) | Visible light transmittance (%) | Thermal conductivity mW/(m · K) |
|---|---|---|---|---|---|---|
| SH1-24-1 | 0.23 | 904 | 37.4 | 3.57 | 76.9 | — |
| SH1-48-1 | 0.23 | 950 | 28.1 | 3.50 | 83.2 | 15.3 |
| AH1-48-1 | 0.31 | 902 | 24.4 | 2.38 | 90.2 | — |
| AH1-48-1-M | 0.24 | 930 | 28.1 | 3.32 | 87.3 | — |
| AH1-48-1-100 | 0.21 | 906 | 43.6 | 3.95 | 80.6 | 15.4 |
| SH1-48-2 | 0.19 | 919 | 43.6 | 4.39 | 76.4 | 15.2 |
| AH1-48-2-100 | 0.18 | 908 | 50.4 | 4.70 | 73.5 | — |
| SH1-48-3 | 0.16 | 937 | 58.1 | 5.37 | 68.6 | 15.0 |
| SC1-48-1 | 0.21 | 948 | 37.4 | 3.91 | 80.1 | 16.4 |
| AC1-48-1 | 0.28 | 901 | 24.4 | 2.72 | 82.2 | — |
| AC 1-48-1-M | 0.22 | 926 | 37.4 | 3.70 | 80.5 | 16.5 |
| SC1-48-2 | 0.18 | 958 | 50.4 | 4.68 | 72.9 | 16.2 |
| SH1-6-1 | 0.22 | 248 | >100 | 3.69 | 0 | — |
| SH1-12-1 | 0.22 | 701 | 58.1 | 3.73 | 16.8 | — |
| SH1-72-1 | 0.23 | 953 | 28.1 | 3.46 | 84.3 | — |
| SH5-48-1 | 0.23 | 936 | 32.3 | 3.48 | 84.6 | — |

*A visible light transmittance of 2 is a transmittance, of a low-density gel product having a thickness of 2 mm, in the thickness direction with respect to light having a wavelength of 550 nm.
* "—" indicates no measurement.

Hereinafter, a discussion of the results will be described.

It was confirmed that the polymerization time at the time of PVMDMS polymerization influences the structures and the properties of the produced PVPMS wet gel and low-density gel product.

It was considered that unreacted VMDMS that has not been polymerized in the polymerization system tends to form cyclic and chain molecular structures during the hydrolysis and polycondensation process in the sol-gel reaction, and the formation of the molecular structures leads to non-uniform gelation of sol. Moreover, when the amount of VMDMS remaining in the polymerization system was large, macro-phase separation between a hydrophobic polycondensate and the polar solvent easily occurred, and a low-density gel product with a low visible light transmittance having precipitation or coarse gel domain tended to be formed. Meanwhile, although it is considered that similar macro-phase separation may also proceed by the hydrophobicity of a siloxane condensate during hydrolysis and polycondensation of PVMDMS, it is inferred that macro-phase separation due to the hydrophobicity of PVMDMS itself was inhibited as compared to macro-phase separation due to the remaining VMDMS, probably because PVMDMS molecules with a relatively high degree of polymerization (greater than 40 in the example sample) had a large number of hydrolyzable groups, thereby promoting a high crosslink density and more uniform gelation.

Figure 5A:
FIG. 5A is a diagram showing the appearance of the low-density gel products (aerogels) produced in the examples.

More specifically, whereas the visible light transmittance of the wet gel was low when the polymerization time of PVMDMS was short (6 or 12 hours), the visible light transmittance of the gel was greatly improved when the polymerization time was longer (24, 48, or 72 hours). Correspondingly, whereas the low-density gel products (samples SH1-6-1 and SH1-12-1) with a polymerization time of PVMDMS being 6 or 12 hours were white opaque or translucent (see FIG. 5A), the low-density gel products (samples SH1-24-1, SH1-48-1, and SH1-72-1) with a polymerization time of 24, 48, or 72 hours were transparent with bluishness due to Rayleigh scattering of short-wavelength light caused by fine nanoparticles formed by more uniform gelation (see FIG. 5A and FIG. 5B).

As shown in Table 3, the bulk densities of the PVPMS low-density gel products produced in the present examples were in the range of 0.16 to 0.31 g/cm$^3$, and the visible light transmittances of the low-density gel products for which the polymerization times of PVMDMS were 48 and 72 hours were in the range of 68 to 91%, and were in the range of 70 to 91% and further in the range of 80 to 91% depending on the conditions.

Figure 6:
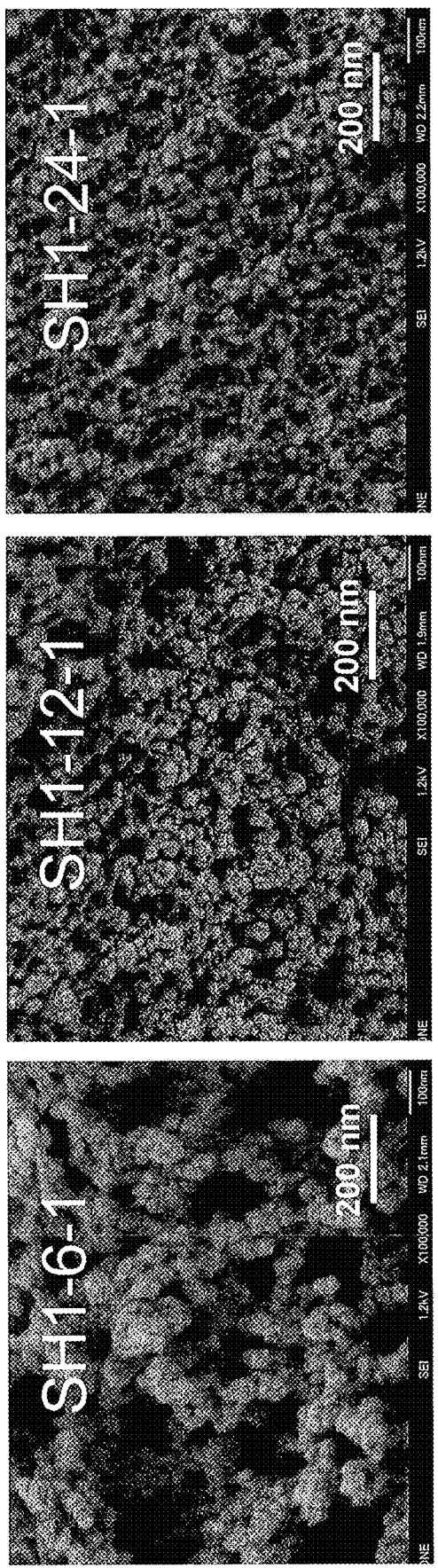
FIG. 6 is a diagram showing observation images by a scanning electron microscope (SEM) of cross-sections of the low-density gel products (aerogels) produced in the examples.
Figure 7A:
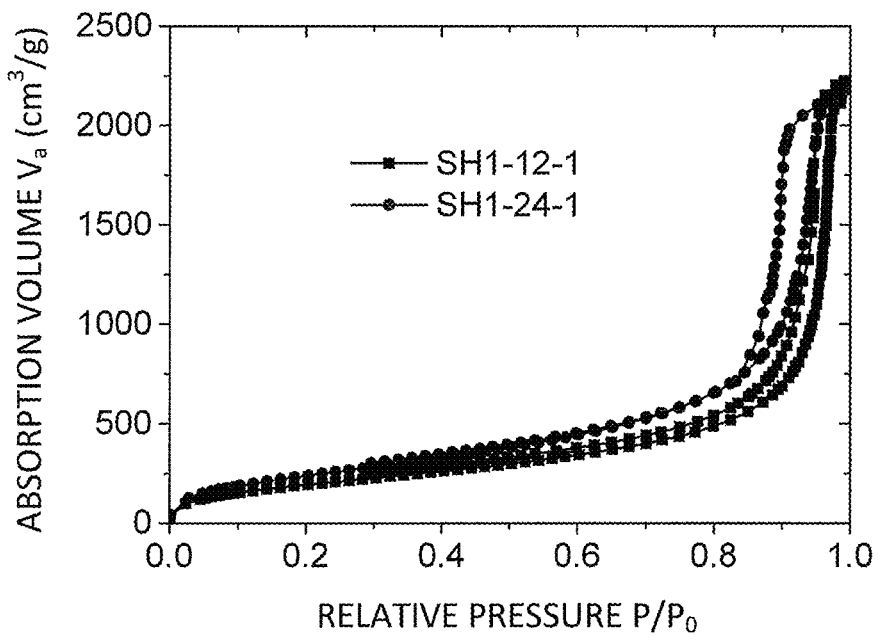
FIG. 7A is a graph showing evaluation results of nitrogen adsorption/desorption isotherms of the low-density gel products (aerogels) produced in the examples.
Figure 7B:
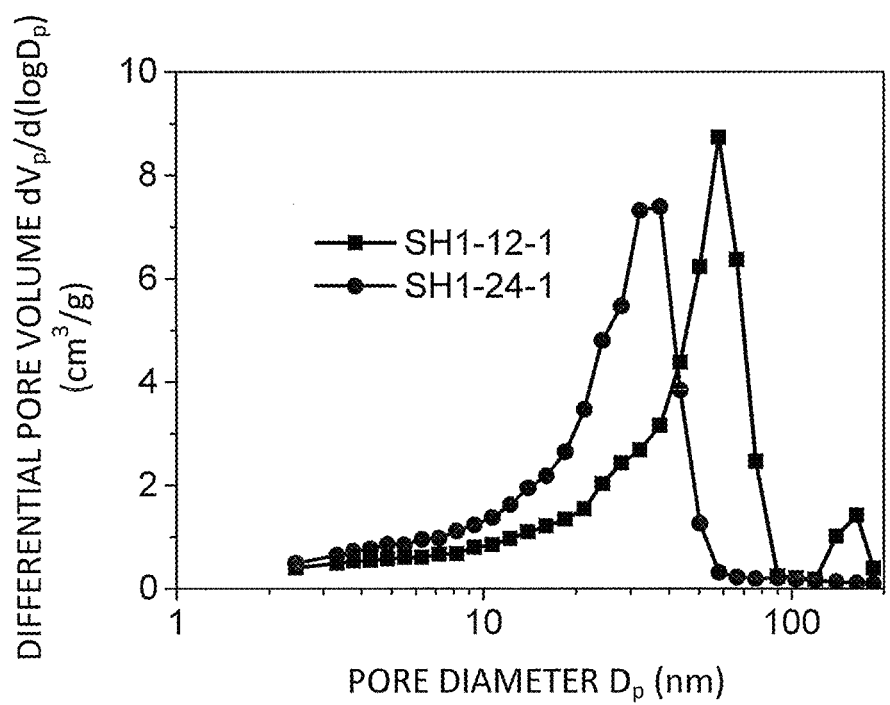
FIG. 7B is a graph showing evaluation results of pore distributions of the low-density gel products (aerogels) produced in the examples.

Moreover, as the polymerization time of PVMDMS became longer, the specific surface area (SSA) of the low-density gel product tended to increase, and the pore diameter and the skeleton diameter of the low-density gel product tended to decrease. Specifically, the SSAs of the low-density gel products for which the polymerization times of PVMDMS were 24, 48, and 72 hours exceeded 900 m$^2$/g and were larger than the SSAs of the low-density gel products with a shorter polymerization time (248 m$^2$/g for sample SH1-6-1, 701 m$^2$/g for sample SH1-12-1). In addition, the average pore diameter decreased from over 100 nm for sample SH1-6-1 to 58.1 nm for sample SH1-12-1, and further to 28.1 nm for sample SH1-72-1. Moreover, also from observation images (FIG. 6) by an SEM of cross-sections of samples SH1-6-1, SH1-12-1, and SH1-24-1, it was confirmed that sample SH1-6-1 for which the polymerization time of PVMDMS was 6 hours has large pores and a skeleton that is an aggregate of large particles. It is inferred that the structure of sample SH1-6-1 is based on macrophase separation due to a reduction in the degree of crosslinking of the hydrophobic polycondensate. Moreover, from FIG. 6, it can be seen that the pore diameter and the skeleton diameter of the low-density gel product tend to decrease as the polymerization time of PVMDMS becomes longer. This tendency was confirmed also from the results of nitrogen adsorption/desorption isotherm evaluation and pore distribution evaluation shown in FIG. 7A and FIG. 7B.

Figure 4:
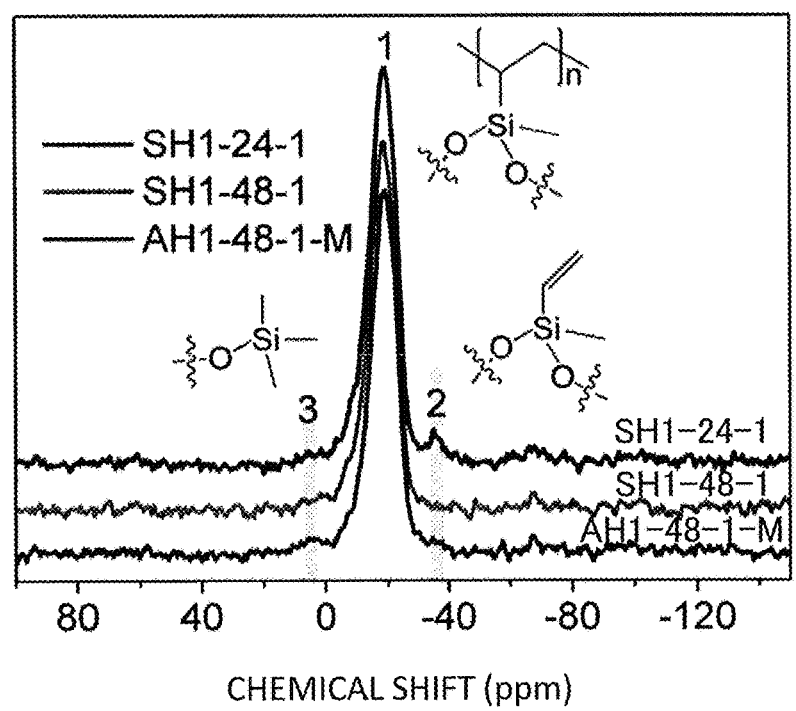
FIG. 4 is a graph showing evaluation results of solid-phase $^{29}$Si-nuclear magnetic resonance (NMR) for the low-density gel products (aerogels and xerogels) produced in the examples.

According to the evaluation results of FTIR shown in FIG. 3 and the evaluation results of $^{29}$Si-NMR shown in FIG. 4, it was confirmed that the skeleton of the obtained PVPMS low-density gel product contains abundant methyl groups and vinyl polymer chain derived from the methyl groups and the vinyl groups bonded to the silicon atoms of VMDMS. On the other hand, the amount of —OH groups contained in the skeleton was small.

In the FTIR spectra, absorption at wave numbers of 2962 cm$^{-1}$, 2920 cm$^{-1}$, and 2851 cm$^{-1}$ corresponds to stretching vibration of C—H bonds, and absorption at wave numbers of 1456 cm$^{-1}$ and 1406 cm$^{-1}$ corresponds to bending and deformation of C—H bonds. Absorption around wave numbers of 1260 cm$^{-1}$ and 815 cm$^{-1}$ corresponds to deformation of C—H bonds and stretching motion of Si—C bonds, respectively. These C—H and Si—C bonds are based on the methyl groups and the vinyl polymer chain in the PVPMS low-density gel product.

Meanwhile, in the FTIR spectra, broad and weak absorption between wave numbers of 3000 cm$^{-1}$ and 3600 cm$^{-1}$ corresponds to stretching motion of —OH groups. The broad and weak absorption means that the amount of —OH groups contained in the low-density gel product is small. Absorption was observed around a wave number of 780 cm$^{-1}$ and around a wave number of 1085 cm$^{-1}$ corresponding to stretching motion of Si—O—Si bond, whereby the formation of a polyorganosiloxane chain by the gelling step was confirmed.

In the $^{29}$Si-NMR profiles in FIG. 4, the sharp peak located at a chemical shift of –19 ppm corresponds to the $(CH_2CH)_n$ $(CH_3)SiO_{2/2}$ species. The presence of the above abundant methyl groups, vinyl polymer chain, and polyorganosiloxane chain was also confirmed by the $^{29}$Si-NMR profiles.

Figure 8:
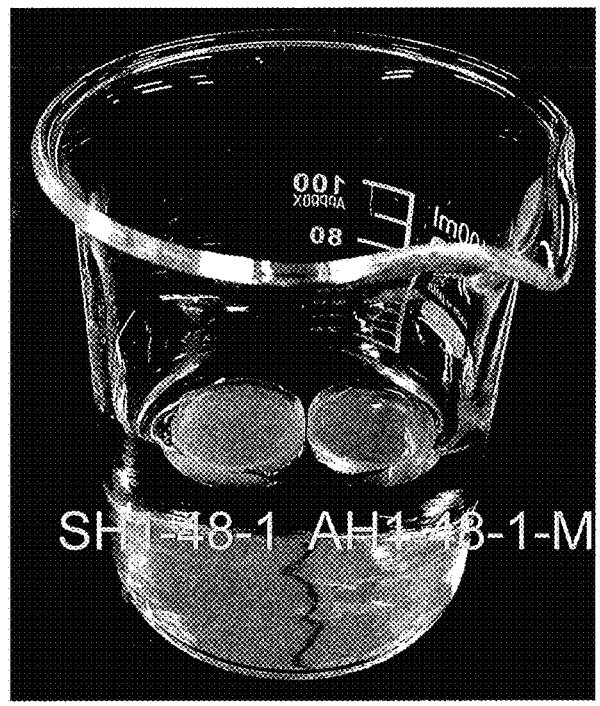
FIG. 8 is a diagram showing a state where the low-density gel products (aerogel and xerogel) produced in the examples were floating in water.
Figure 9:
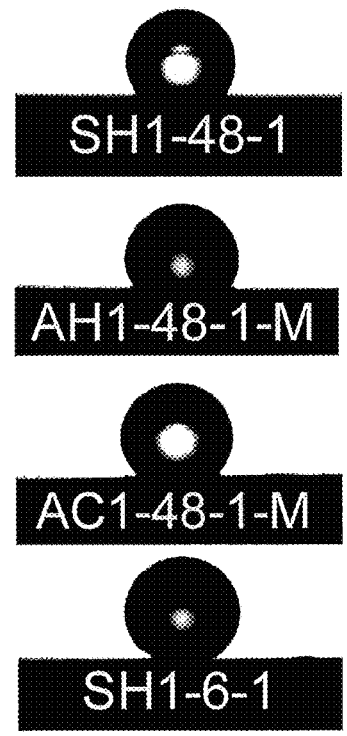
FIG. 9 is a diagram showing contact states and contact angles of water on the surfaces of the low-density gel products (aerogels and xerogels) produced in the examples.

As shown in FIG. 8, it was confirmed that the low-density gel products (sample SH1-48-1 and sample AH1-48-1-M) produced in the examples floated on a water surface for at least 2 months. This is because the low-density gel products each have a non-conventional structure containing abundant methyl groups and a small amount of —OH groups, and exhibit high hydrophobicity. The contact angles of water on the surfaces of all the low-density gel products produced in the examples were 120° or more. In addition, as the polymerization time of PVMDMS was shorter, a low-density gel product having a rougher surface was formed, and thus the hydrophobicity of the surface tended to increase due to the effect of the shape. FIG. 9 shows the contact states of water on the surfaces of the samples having different polymerization times of PVMDMS. Sample SH1-6-1 exhibited super water repellency with a contact angle of 154°.

Figure 10:
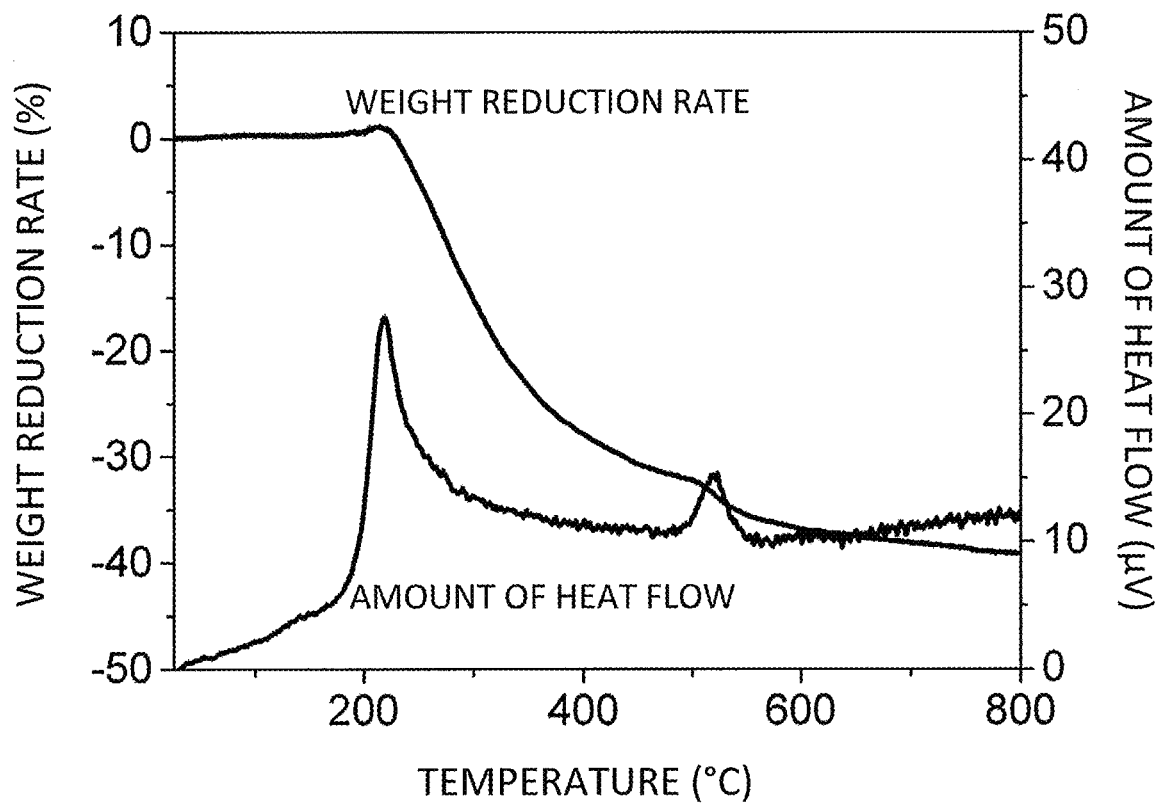
FIG. 10 is a graph showing evaluation results of thermal stability by thermogravimetric analysis (TG-DTA) of the low-density gel product (aerogel) produced in the examples.

FIG. 10 shows the evaluation results of thermal stability by TG-DTA for sample SH1-48-1. As shown in FIG. 10, sample SH1-48-1 was stable up to around 200° C. In the TG-DTA profile shown in FIG. 10, the heat flow around 200° C. corresponds to thermal decomposition of the vinyl polymer chain, and the second heat flow starting from around 490° C. corresponds to thermal decomposition of the methyl group.

Figure 11:
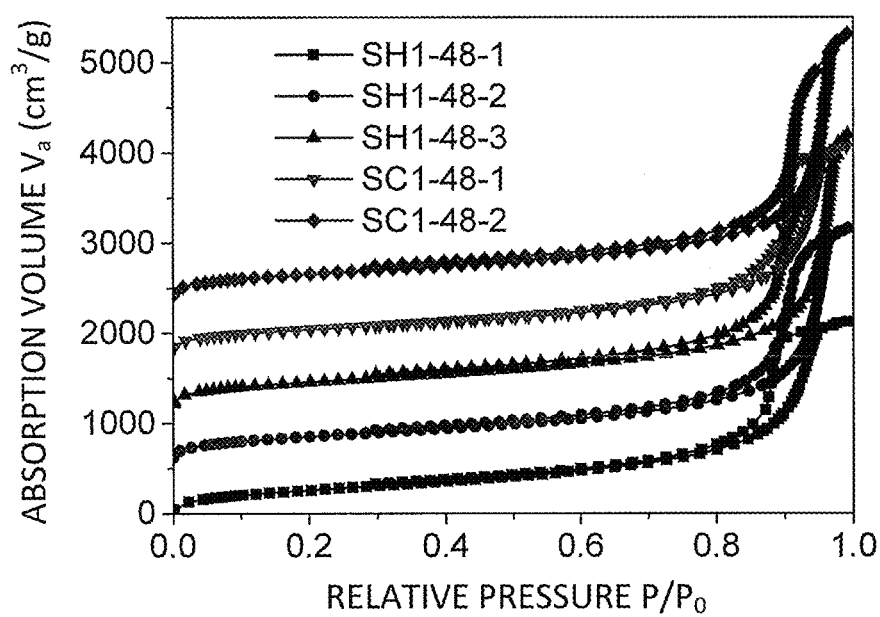
FIG. 11 is a graph showing evaluation results of nitrogen adsorption/desorption isotherms of the low-density gel products (aerogels) produced in the examples.

As shown in FIG. 11, in the nitrogen adsorption/desorption isotherm evaluation, the low-density gel products produced in the examples each exhibited a type IV isotherm, having a capillary condensation process at a relative pressure of 0.5 to 1.0, corresponding to the mesoporous three-dimensional network structure of the low-density gel product.

Figure 12:
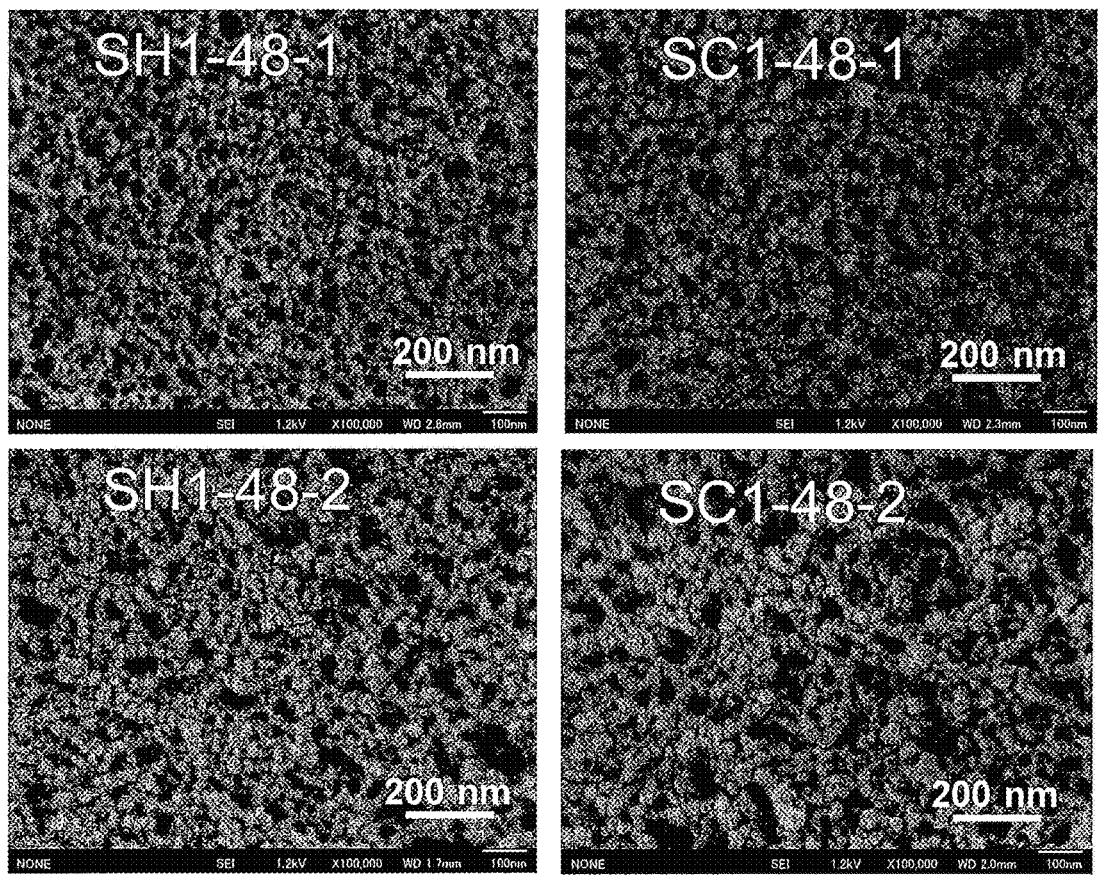
FIG. 12 is a diagram showing observation images by an SEM of cross-sections of the low-density gel products (aerogels) produced in the examples.

FIG. 12 shows SEM observation images of cross-sections of samples SH1-48-1, SC1-48-1, SH1-48-2, and SC1-48-2. As shown in FIG. 12, these low-density gel products each had a randomly interconnected uniform porous structure composed of aggregated nanoparticles.

Regarding TMACO and TMAOH which were the basic catalysts used in the sol-gel reaction, the basicity of TMACO is lower than that of TMAOH. This is also obvious from the fact that TMACO is obtained by a reaction of TMAOH with carbon dioxide. From the results shown in Table 3 and FIG. 12, it was confirmed that, when TMAOH having a higher basicity was used in the sol-gel reaction where only the type of basic catalyst was different (the catalyst concentration was the same), the pore diameter and the skeleton diameter tended to decrease and the visible light transmittance tended to increase. It is considered that this is due to the fact that the polycondensation reaction is promoted by the use of the catalyst having a high basicity.

Specifically, the pore diameter and the particle diameter of sample SH1-48-1 were in the range of 10 to 40 nm and in the range of 10 to 35 nm, respectively. Meanwhile, the pore diameter and the particle diameter of sample SC1-48-1 were in the range of 10 to 50 nm and in the range of 15 to 50 nm, respectively, and the pore diameter and the particle diameter of sample SH1-48-1 were smaller than those of sample SC1-48-1. As shown in Table 3, sample SH1-48-1 exhibited a higher visible light transmittance than sample SC-48-1.

Moreover, the polycondensation reaction in the aging period of the wet gel was promoted by using TMAOH which is a catalyst having a higher basicity. This can be confirmed from the fact that the amount of volume reduction (shrinkage amount) during the aging period was large when TMAOH was used as the catalyst.

The large shrinkage amount can also be confirmed from the fact that, as shown in Table 3, sample SH1-48-1 has a higher density and a smaller total pore volume than sample SC1-48-1. The SSAs of both samples were substantially equal to each other (about 950 m$^2$/g).

For sample SH1-48-2 and sample SC1-48-2, the same tendency as for sample SH1-48-1 and sample SC1-48-1 was confirmed.

Figure 13:
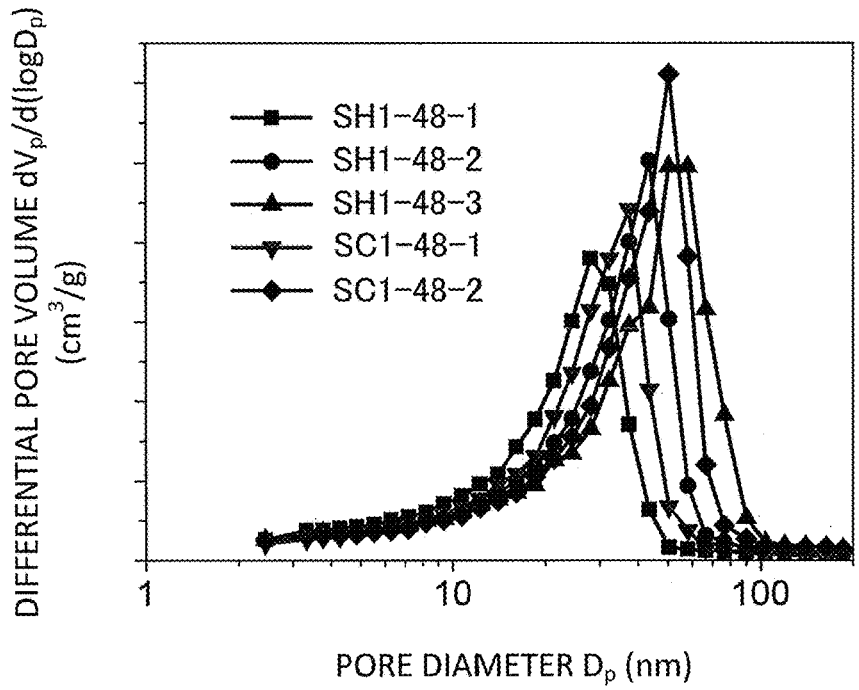
FIG. 13 is a graph showing evaluation results of pore distributions of the low-density gel products (aerogels) produced in the examples.

Samples SH1-48-2, SH1-48-3, and SC1-48-2 for which the concentration of the organic precursor chain in the solution system in the gelling step was relatively low exhibited high SSAs exceeding 900 m$^2$/g, similar to samples SH1-48-1 and SC1-48-1 for which the concentration was relatively high. However, for samples SH1-48-2, SH1-48-3, SC1-48-2, as shown in FIG. 12 and FIG. 13, as compared to samples SH1-48-1 and SC1-48-1, the pore diameter became larger, and the pore diameter distribution tended to expand and move in a direction in which the particle diameter is larger. For example, the pore diameter and the particle diameter of sample SC1-48-2 were in the range of 10 to 60 nm and in the range of 15 to 60 nm, respectively, and were larger than the ranges of the pore diameter and the particle diameter of sample SC1-48-1. In addition, the scattering of visible light became stronger when the pore diameter was larger, and thus the visible light transmittance of the low-density gel product formed under a condition where the concentration of the organic precursor chain in the solution system was relatively low tended to decrease as compared to that of the low-density gel product formed under a condition where the concentration was relatively high. For example, whereas the visible light transmittance of sample SH1-48-1 was 83.2%, the visible light transmittance of sample SH1-48-2 was 76.4%, and the visible light transmittance of sample SH1-48-3 was 68.6%. Moreover, as the concentration of the organic precursor chain in the solution system became lower, the bulk density of the low-density gel product decreased. For example, whereas the bulk density of sample SH1-48-1 was 0.23 g/cm$^3$, the bulk density of sample SH1-48-2 was 0.19 g/cm$^3$, and the bulk density of sample SH1-48-3 was 0.16 g/cm$^3$.

Figure 14A:
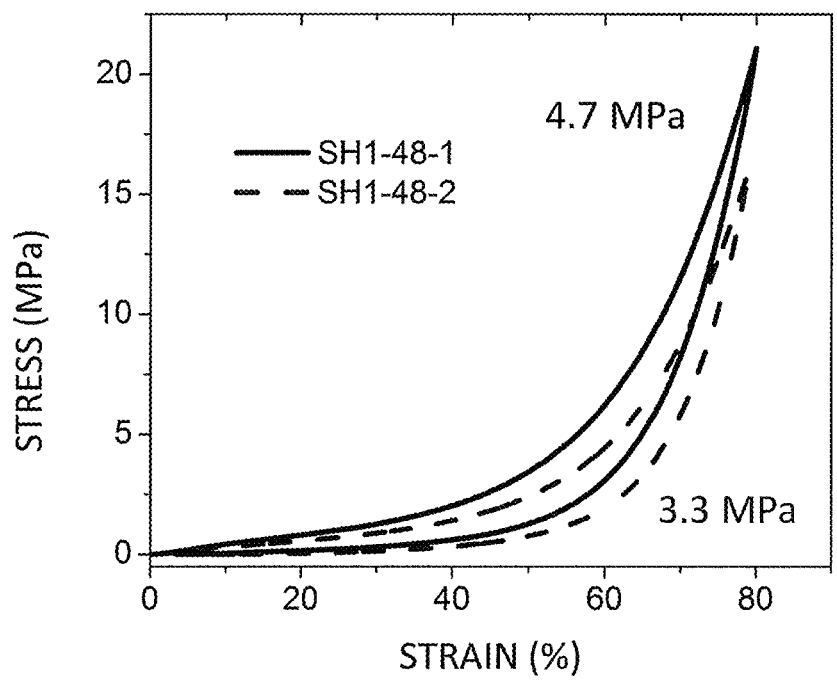
FIG. 14A is a graph showing stress-strain curves (S-S curves) in a uniaxial compression test of the low-density gel products (aerogels) produced in the examples.
Figure 14B:
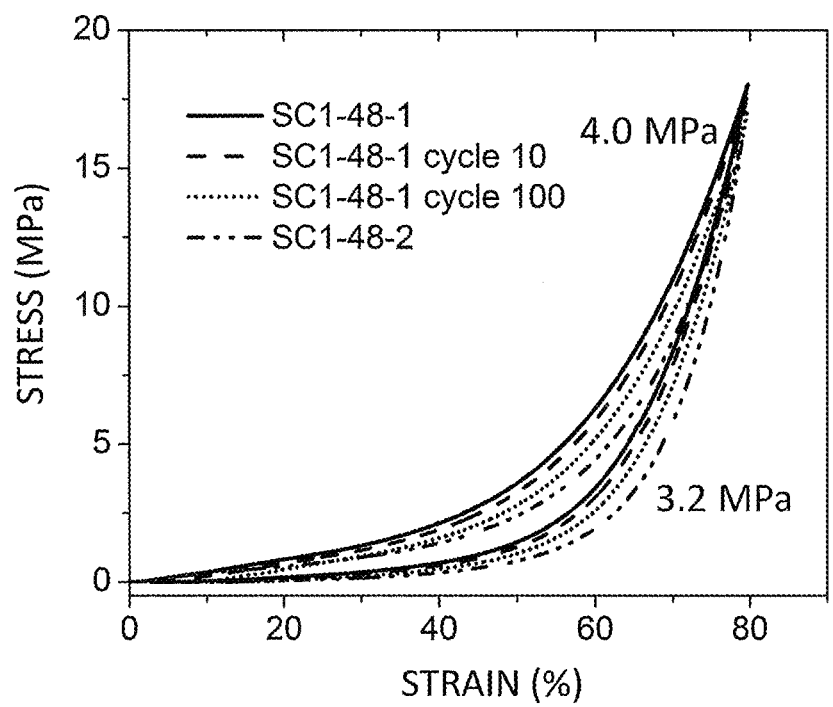
FIG. 14B is a graph showing S-S curves in the uniaxial compression test of the low-density gel products (aerogels) produced in the examples.
Figure 15A:
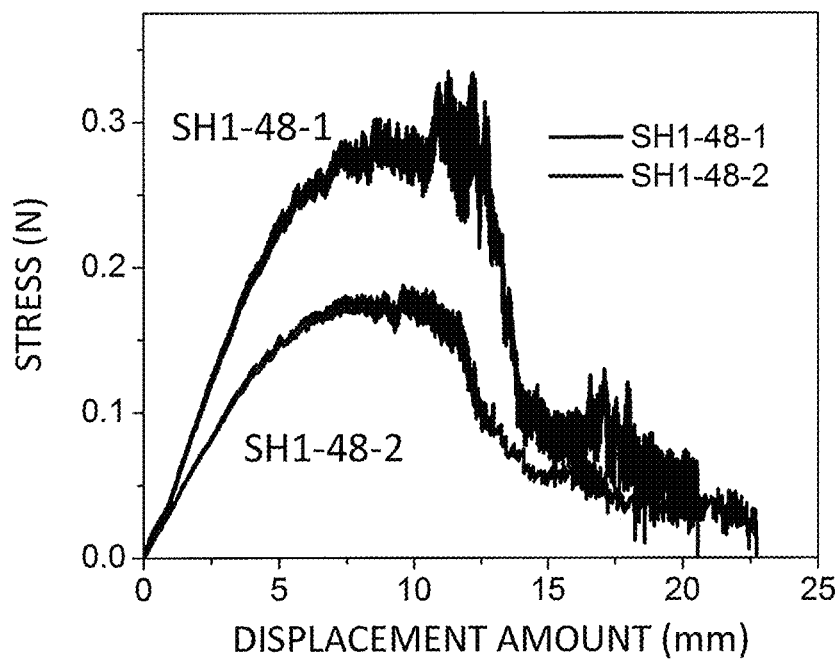
FIG. 15A is a graph showing S-S curves in a three-point flexural test of the low-density gel products (aerogels) produced in the examples.
Figure 15B:
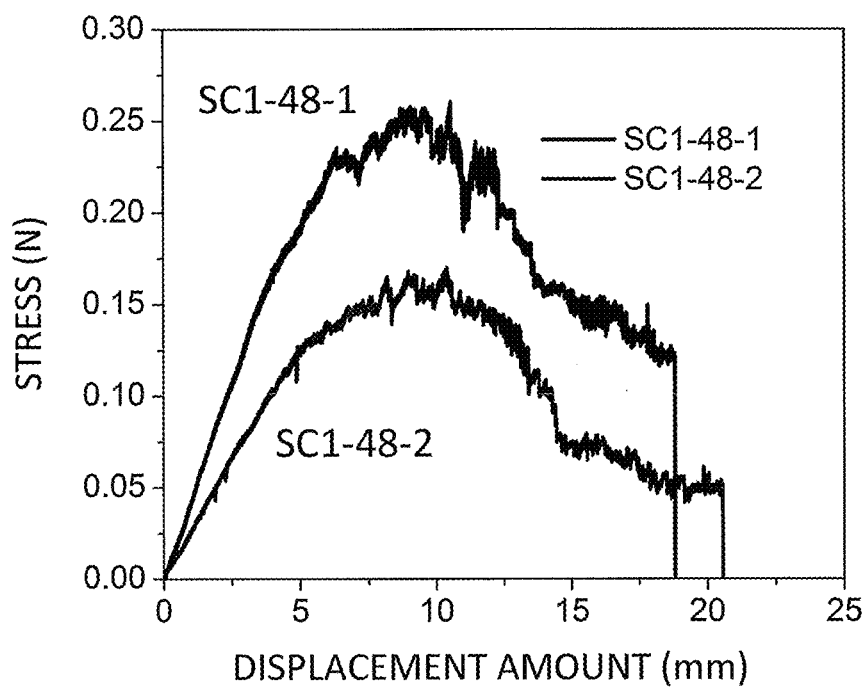
FIG. 15B is a graph showing S-S curves in the three-point flexural test of the low-density gel products (aerogels) produced in the examples.

FIG. 14A and FIG. 14B show S-S curves in the uniaxial compression test of the produced low-density gel products. FIG. 15A and FIG. 15B show S-S curves in the three-point flexural test of the produced low-density gel products. Each of the samples shown in FIG. 14A to FIG. 15B had high strength, flexibility, and restorability with respect to compressive force and high strength, flexibility, and restorability with respect to bending force. For example, even when compression with a compression rate of 80% or bending with a displacement amount of 18 to 24 mm was applied to these samples, damage such as cracks did not occur, and these samples were able to return to substantially the original shape by removing the compressive force or bending force.

Regarding sample SC1-48-1, it was confirmed that the sample had a property (spring back property) of returning to substantially the original shape even when a cycle of uniaxial compression and release was repeated 100 times. Specifically, as shown in FIG. 14B, the S-S curve after 100 cycles maintained substantially the same shape as the initial S-S curve.

The Young's moduli of samples SH1-48-1 and SC-48-1 determined from the S-S curves by the uniaxial compression test were 5.2 MPa and 4.0 MPa, respectively. In addition, the elastic moduli of samples SH1-48-2 and SC1-48-2 were 3.4 MPa and 3.2 MPa, respectively. The Poisson's ratio of sample SH1-48-1 was about 0.1.

Samples SH1-48-2 and SC1-48-2 had compression flexibility and bending flexibility similar to those of samples SH1-48-1 and SC1-48-1, but tended to have slightly lower elasticity than these samples. Specifically, as shown in FIGS. 14A and 14B, the recovery rate (spring back rate) after compression of samples SH1-48-2 and SC1-48-2 were 87% and 93%, respectively, when the compression rate in the uniaxial compression test was 80%. However, after the compressive force was released, the recovery rates after these samples were allowed to stand at room temperature for about 1 hour increased to 95% and 99%, respectively, and these samples were able to return to substantially the original shape by performing further heat treatment thereon at 120° C. for 1 hour. It is inferred that this is because during compression, the skeleton with flexibility is folded into a relatively large-size pore, and the skeleton is kept folded immediately after the compressive force is removed, but, during standing at room temperature, the folding is gradually unraveled, and the methyl groups and the vinyl polymer chain in the skeleton rebound and relax by heat treatment, and the spring back continues to occur. Moreover, in the three-point flexural test, similar to samples SH1-48-1 and SC1-48-1, samples SH1-48-2 and SC1-48-2 were able to return to substantially the original shape even after great deformation with a displacement amount 18 to 24 mm.

Figure 16A:
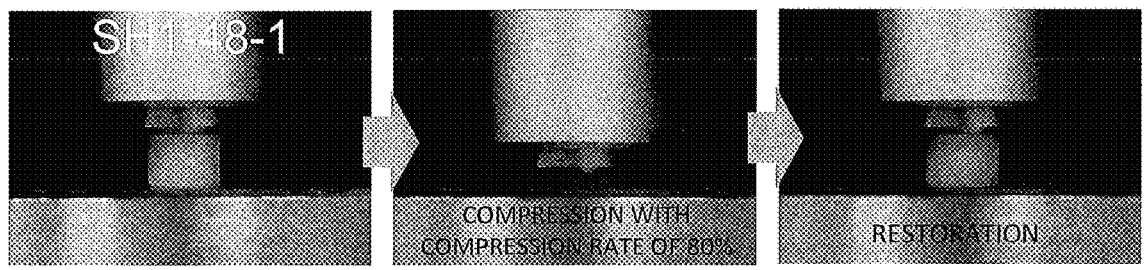
FIG. 16A is a diagram showing states of compression and restoration during the uniaxial compression test of the low-density gel product (aerogel) produced in the examples.
Figure 16B:
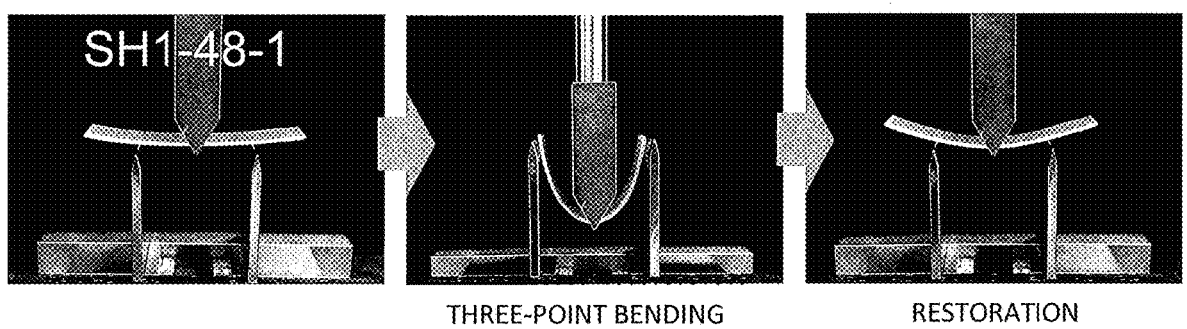
FIG. 16B is a diagram showing states of bending and restoration during the three-point flexural test of the low-density gel product (aerogel) produced in the examples.

FIG. 16A shows states of compression and restoration during the uniaxial compression test (compression rate: 80%) for sample SH1-48-1. FIG. 16B shows states of bending and restoration during the three-point flexural test (displacement amount: about 8 mm) for sample SH1-48-1.

Figure 17A:
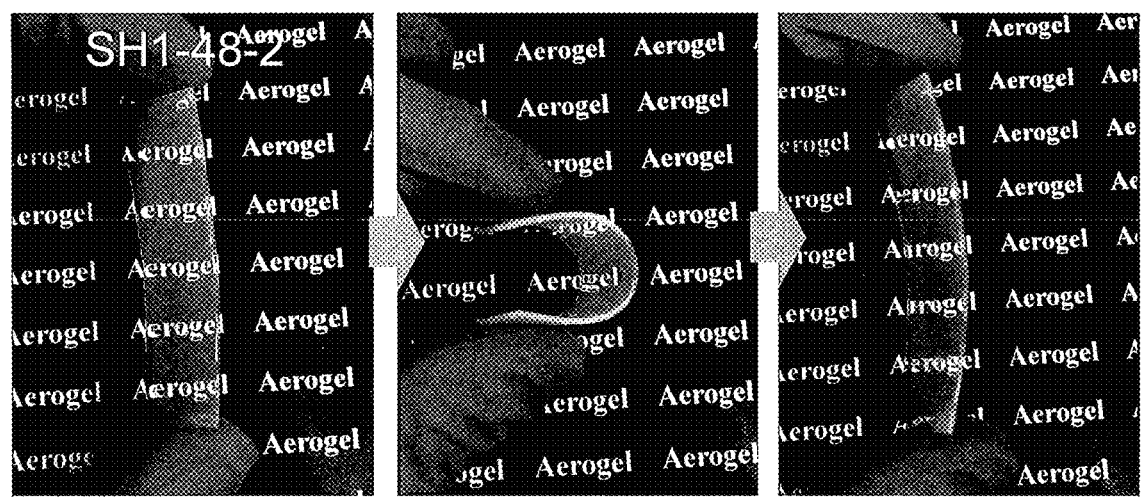
FIG. 17A is a diagram showing states of bending and restoration when the low-density gel product (aerogel) produced in the examples was greatly bent by hand.
Figure 17B:
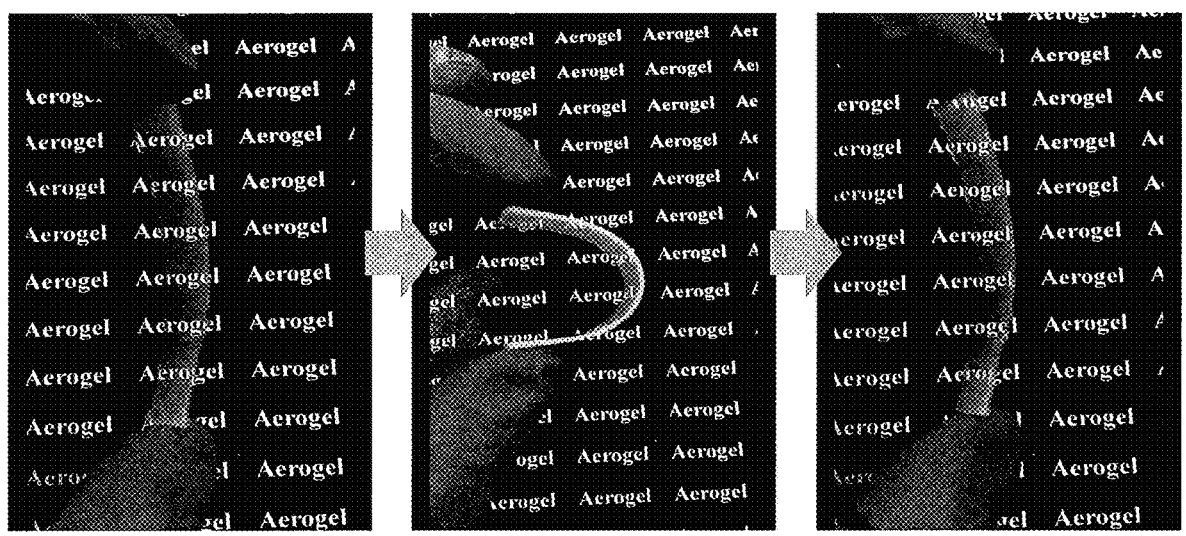
FIG. 17B is a diagram showing states of bending and restoration when the low-density gel product (aerogel) produced in the examples was greatly bent by hand.

Furthermore, as shown in FIG. 17A and FIG. 17B, when samples SH1-48-2 and SH1-48-3 were greatly bent by hand, samples SH1-48-2 and SH1-48-3 were able to be bent without causing damage such as cracks, and were able to return to substantially the original shape by removing the bending force. It was confirmed that these low-density gel products have very high bending properties.

Figure 18A:
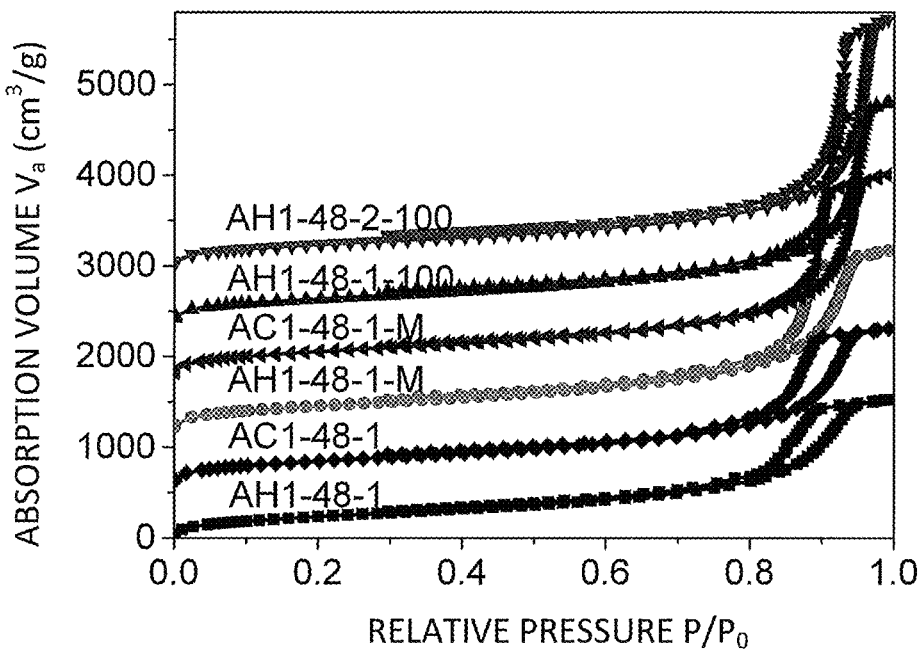
FIG. 18A is a graph showing evaluation results of nitrogen adsorption/desorption isotherms of the low-density gel products (xerogels) produced in the examples.
Figure 18B:
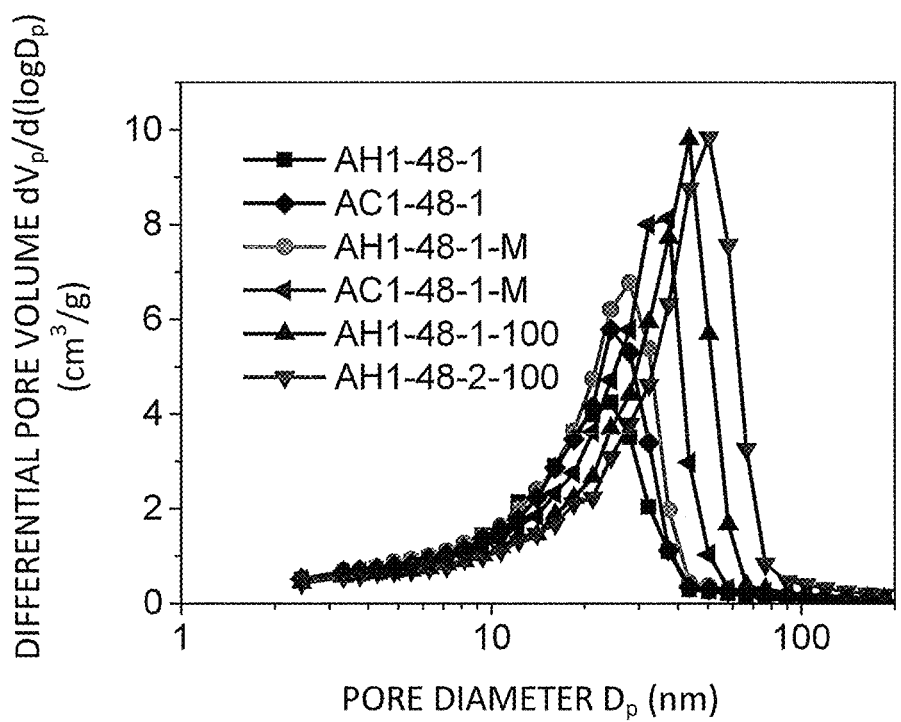
FIG. 18B is a graph showing evaluation results of pore distributions of the low-density gel products (xerogels) produced in the examples.
Figure 19:
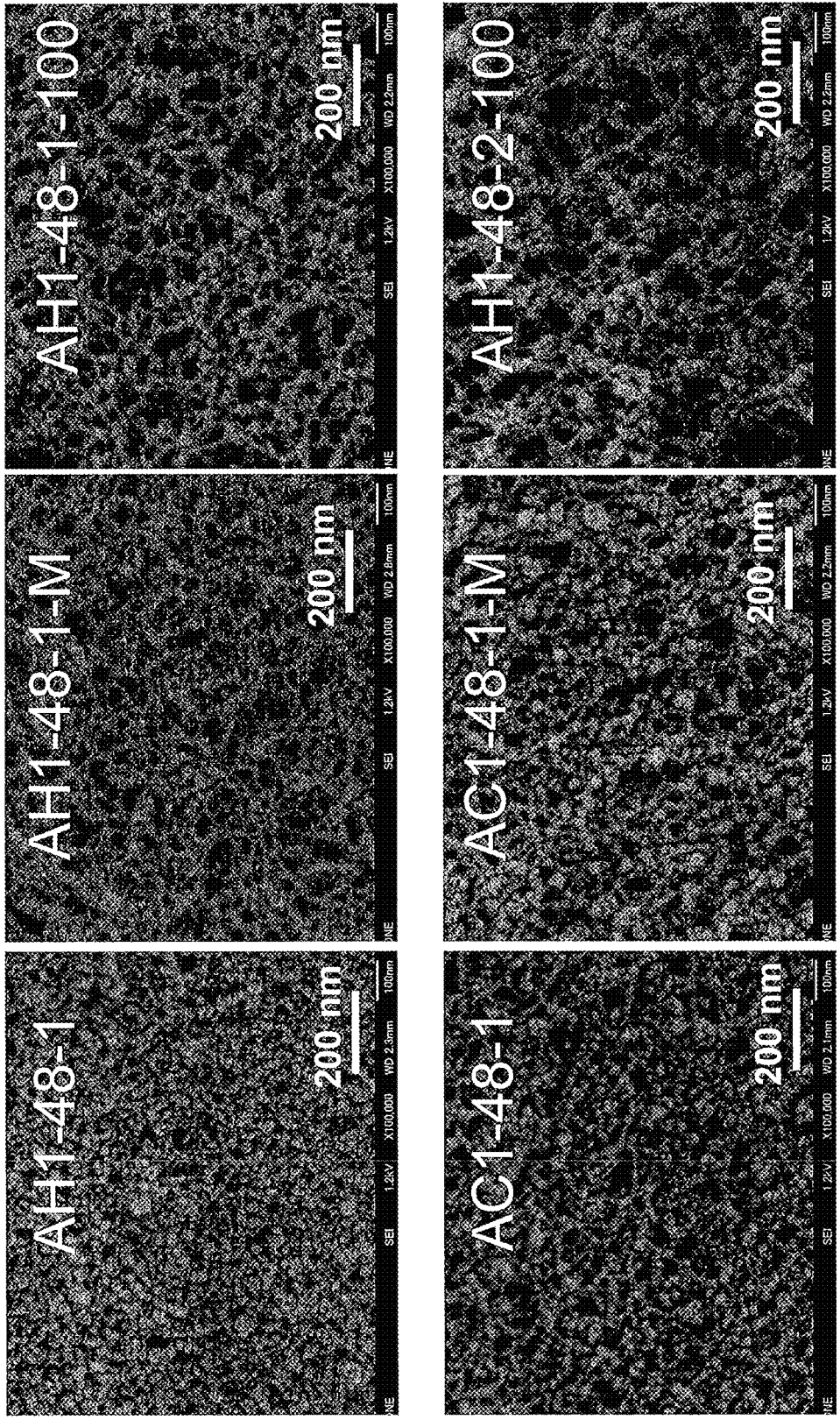
FIG. 19 is a diagram showing SEM observation images of cross-sections of the low-density gel products (xerogels) produced in the examples.

FIG. 18A and FIG. 18B show the results of nitrogen adsorption/desorption isotherm evaluation and pore distribution evaluation for the xerogels obtained by normal-pressure drying. FIG. 19 shows observation images by an SEM of cross-sections of the xerogels. As shown in FIG. 18A, FIG. 18B, and FIG. 19, it was confirmed that a structure and properties similar to those of the aerogels obtained by supercritical drying can also be obtained in the xerogels obtained by normal-pressure drying.

However, regarding the xerogels aged at 80° C. without a modification treatment, the density was higher than those of the corresponding aerogels produced under the same conditions except that the drying method is different. Specifically, the densities of samples AH1-48-1 and AC1-48-1 were 0.31 g/cm$^3$ and 0.28 g/cm$^3$, respectively. On the other hand, the densities of aerogel samples SH1-48-1 and SC1-48-1 were 0.23 g/cm$^3$ and 0.21 g/cm$^3$, respectively. It is considered that the reason for this change in density is that during temporary shrinkage in normal-pressure drying, condensation occurs between a small amount of adjacent —OH groups in the skeleton, resulting in partial irreversible shrinkage. Thus, as shown in Table 3 and FIG. 18B, the range (10 to 40 nm) of the pore diameters and the SSAs (less than 900 m$^2$/g) of samples AH1-48-1 and AC1-48-1 were smaller than the pore diameters and the SSAs of the corresponding aerogel samples SH1-48-1 and SC1-48-1. In addition, the smaller the pore diameter is, the more the scattering of visible light is inhibited, and thus, the visible light transmittances of samples AH1-48-1 and AC1-48-1 were 90.2% and 82.2%, respectively, and were higher than those of the corresponding aerogel samples SH1-48-1 and SC1-48-1 produced under the same conditions except that the drying method is different.

In the wet gels of samples AH1-48-1-M and AC1-48-1-M for which a modification treatment with HMDS was performed, during normal-pressure drying, temporary large shrinkage (shrinkage rate: about 21%) occurred by the capillary force acting on the skeleton, but the wet gels finally returned to substantially the original shape. It is inferred that this is because the abundant methyl groups and vinyl polymer chain are present in the skeletons of these samples and the amount of —OH groups is almost zero.

Regarding sample AH1-48-1-M, as shown in FIG. 3, an absorption peak of —Si(CH$_3$)$_3$ groups was not observed in the absorption spectrum of FTIR, probably due to the low concentration and overlap with the peak corresponding to the methyl group at the end derived from VMDMS. However, as shown in FIG. 4, a peak of —O—Si(CH$_3$)$_3$ groups (around a chemical shift of 6.5 ppm) was observed in the $^{29}$Si-NMR profile.

Figure 5B:
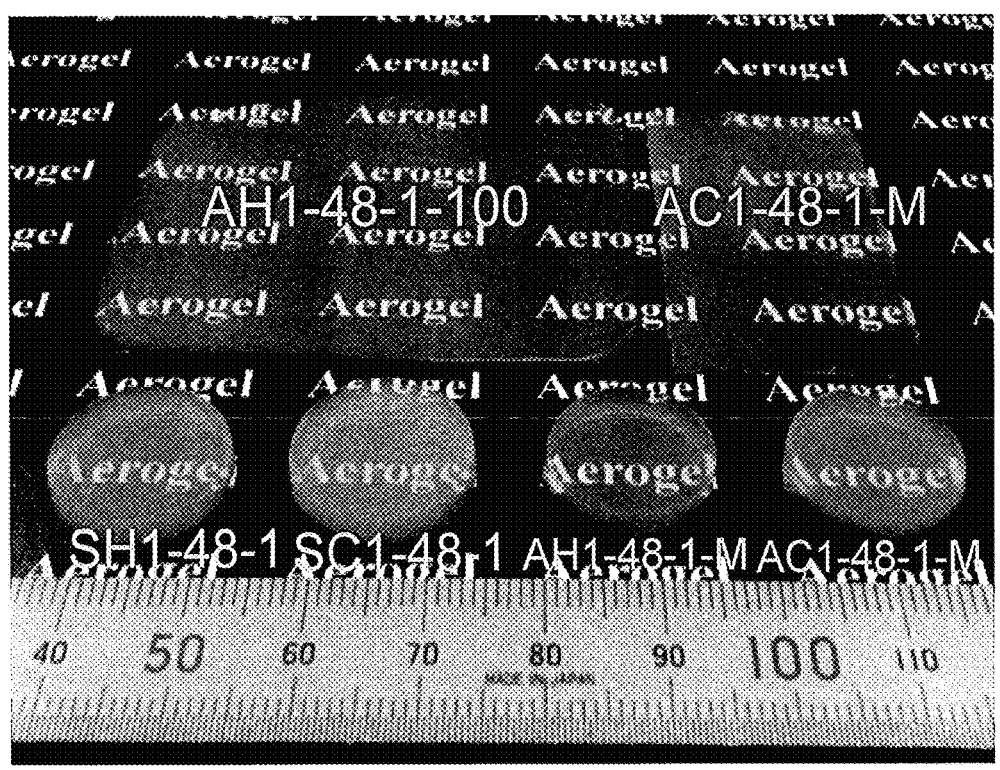
FIG. 5B is a diagram showing the appearance of the low-density gel products (aerogels and xerogels) produced in the examples.
Figure 20:
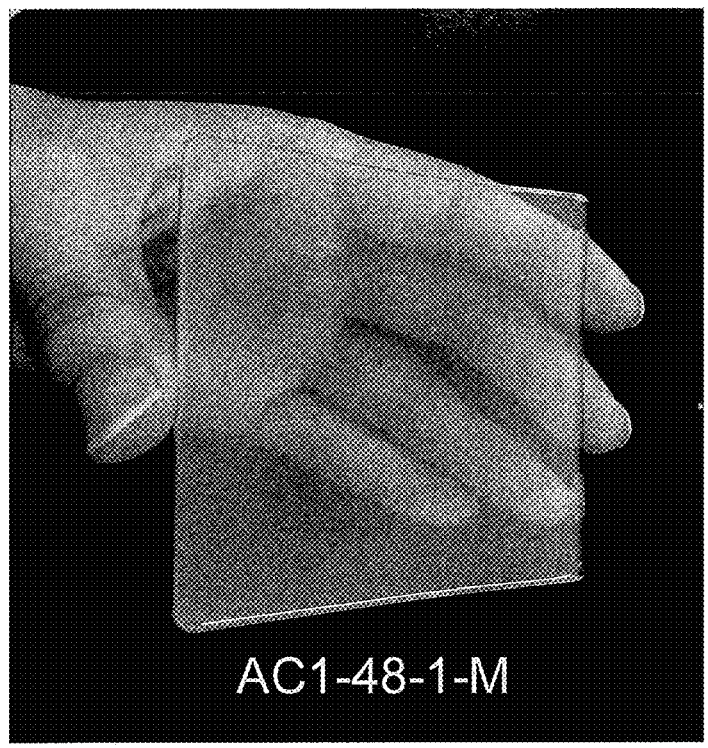
FIG. 20 is a diagram showing the appearance of the low-density gel product (xerogel) produced in the examples.

As shown in FIG. 5B, xerogels that hardly shrink during normal-pressure drying were obtained through this modification treatment. In addition, a large-size xerogel panel (the xerogel itself is the same as sample AC1-48-1-M) in which occurrence of cracks is inhibited was obtained as shown in FIG. 20. Furthermore, this panel was able to be formed simply by scaling up the solution of the solution system from several milliliters to several hundred milliliters. The densities of xerogel samples AH1-48-1-M and AC1-48-1-M treated with HMDS were 0.24 g/cm$^3$ and 0.22 g/cm$^3$, respectively, and were substantially equal to those of the corresponding aerogels having the same production conditions except that only the drying method and the presence/absence of surface treatment are different.

Figure 21:
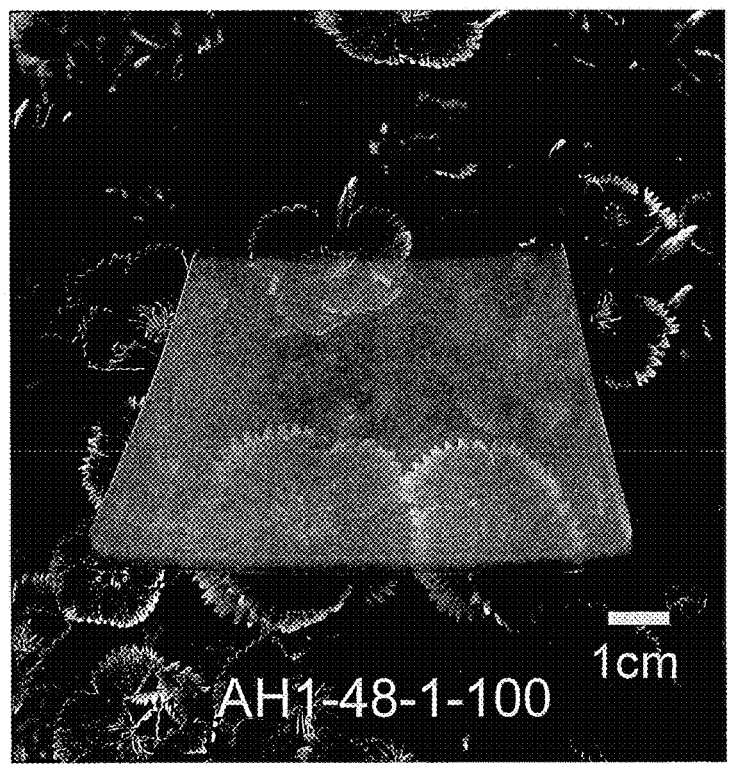
FIG. 21 is a diagram showing the appearance of the low-density gel product (xerogel) produced in the examples.

As shown in FIG. 5B and FIG. 21, xerogels that are transparent monolithic bodies in which almost no shrinkage occurred, such as sample AH1-48-1-100, were obtained even by setting the aging temperature to 100° C. without performing a modification treatment before normal-pressure drying. It is inferred that the reason why irreversible shrinkage was inhibited during normal-pressure drying as compared to the xerogels for which aging was performed at 80° C. is that the polycondensation reaction was further promoted by the aging at a higher temperature, and the amount of —OH groups in the skeleton decreased. This xerogel can be obtained by normal-pressure drying without a modification treatment in which the modifying agent, the solvent, and treatment time are consumed, and thus this xerogel can be produced at low cost and is highly practical. Samples AH1-48-1-100 and AH1-48-2-100 that are xerogels obtained by normal-pressure drying for which the aging temperature was 100° C. had low densities (0.21 g/cm$^3$ and 0.18 g/cm$^3$, respectively) comparable to those of the corresponding aerogels having the same production conditions except that only the drying method and the aging temperature are different.

As shown in FIG. 9, the contact angles for water of samples AH1-48-1-M, AC1-48-1-M, and AH1-48-1-100 were 127°, 133°, and 132°, respectively. As shown in Table 3, the visible light transmittances of these samples were 87.3%, 80.5%, and 80.6%, respectively. In addition, as shown in FIG. 18B, the pore diameters were in the range of 10 to 40 nm, in the range of 10 to 50 nm, and in the range of 10 to 55 nm, respectively. Furthermore, as shown in FIG. 19, the skeleton diameters were in the range of 10 to 35 nm, in the range of 15 to 50 nm, and in the range of 15 to 55 nm, respectively. As shown in Table 3, the total pore volumes were 3.32 cm$^3$/g, 3.70 cm$^3$/g, and 3.95 cm$^3$/g, respectively. The Young's moduli calculated from the S-S curves by the uniaxial compression test shown in FIGS. 22A and 22B were 6.6 MPa, 5.8 MPa, and 7.6 MPa, respectively. These properties of the samples were similar to the properties exhibited by the corresponding aerogels having the same production conditions except that only the drying method and the presence/absence of surface treatment or the aging temperature are different.

Figure 22A:
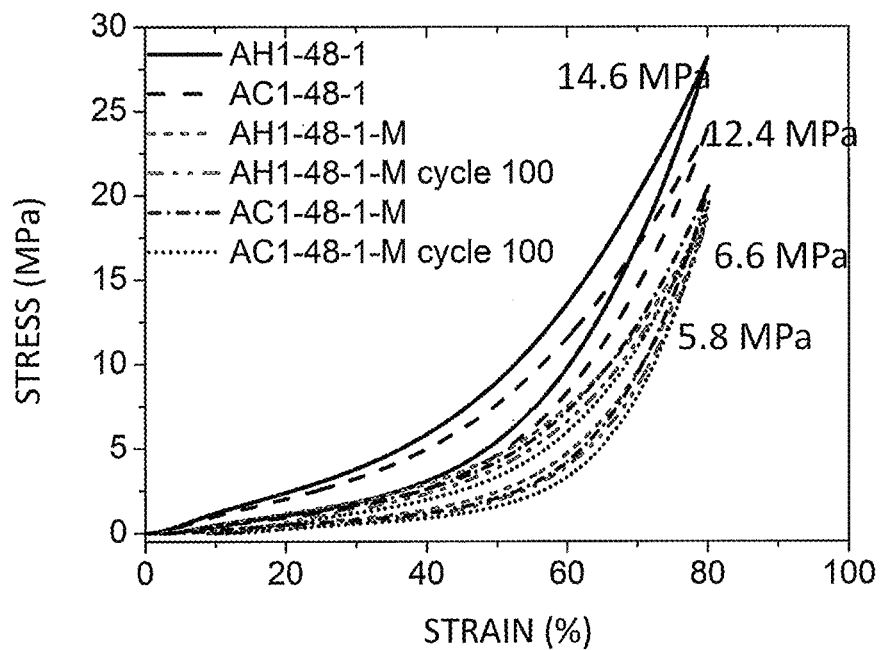
FIG. 22A is a graph showing S-S curves in the uniaxial compression test of the low-density gel products (xerogels) produced in the examples.
Figure 22B:
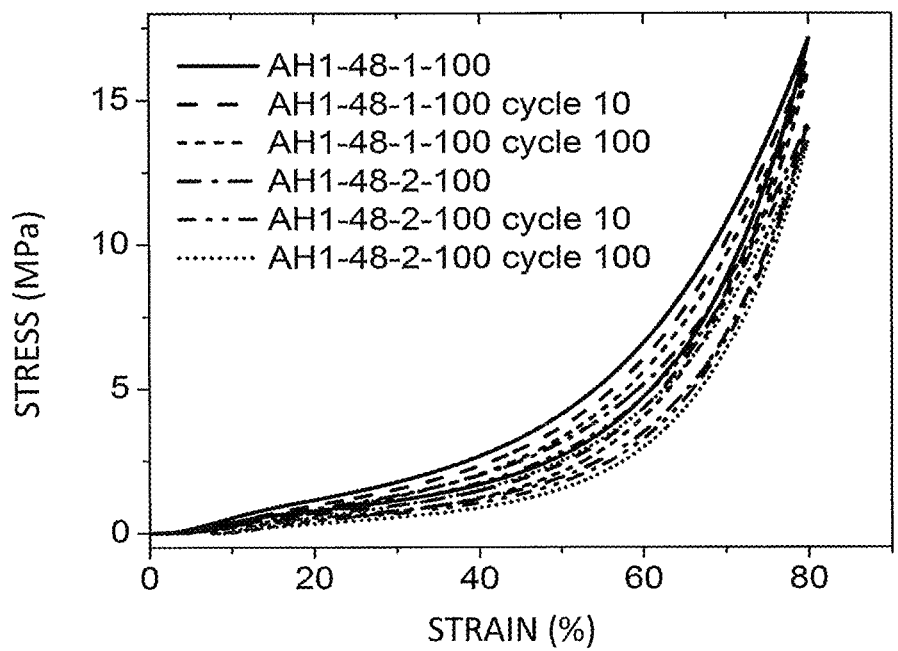
FIG. 22B is a graph showing S-S curves in the uniaxial compression test of the low-density gel products (xerogels) produced in the examples.
Figure 23:
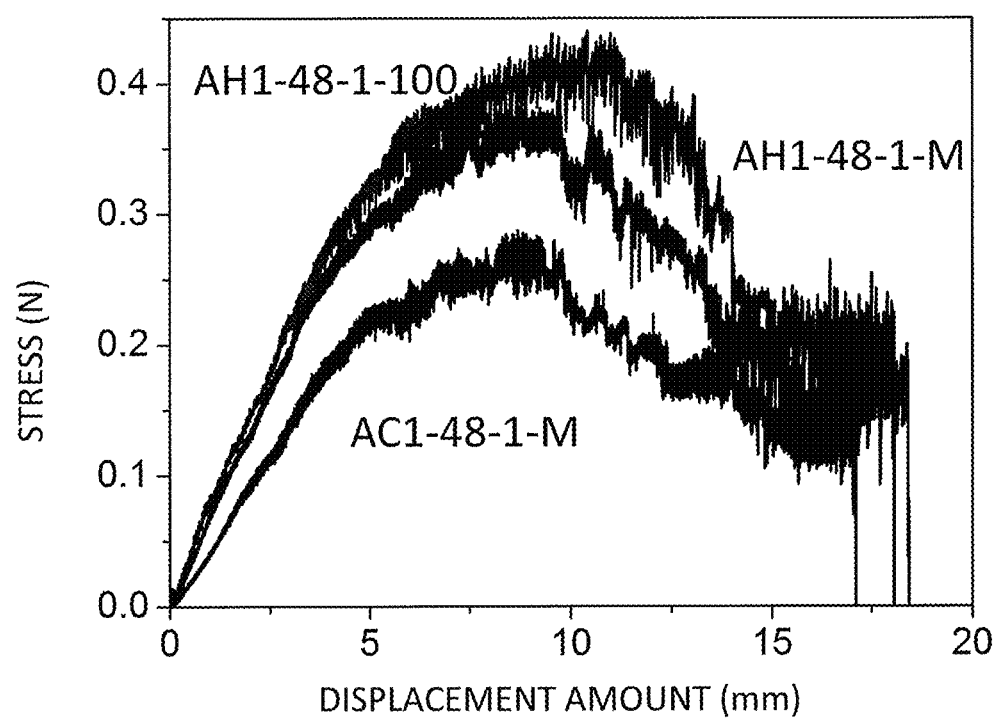
FIG. 23 is a graph showing S-S curves in the three-point flexural test of the low-density gel products (xerogels) produced in the examples.
Figure 24A:
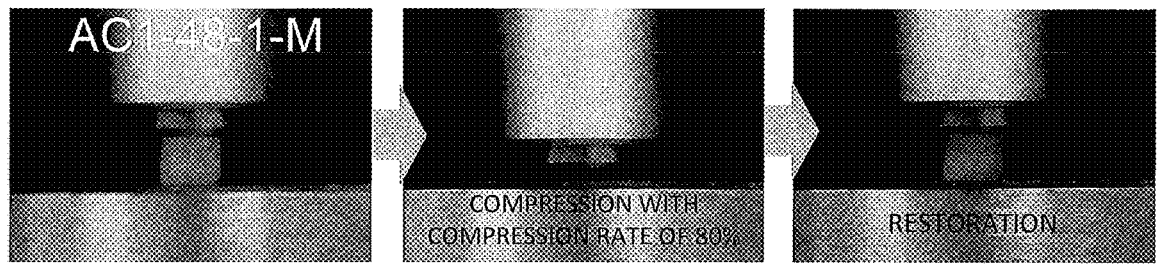
FIG. 24A is a diagram showing states of compression and restoration during the uniaxial compression test of the low-density gel product (xerogel) produced in the examples.
Figure 24B:
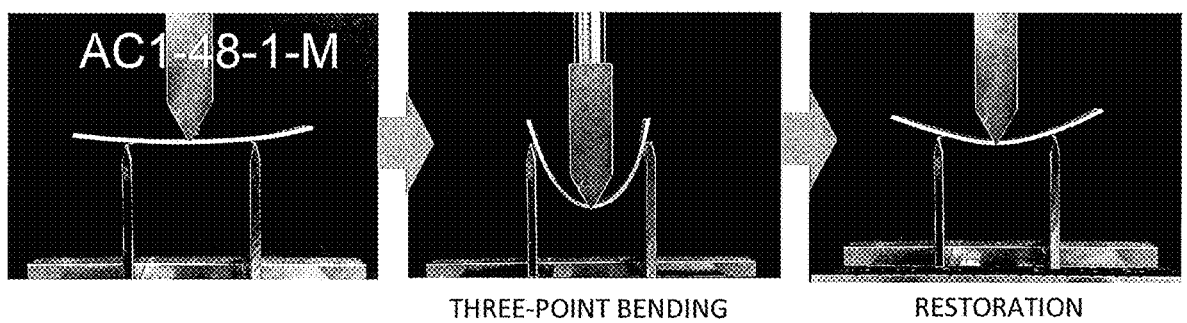
FIG. 24B is a diagram showing states of bending and restoration during the three-point flexural test of the low-density gel product (aerogel) produced in the examples.
Figure 25:
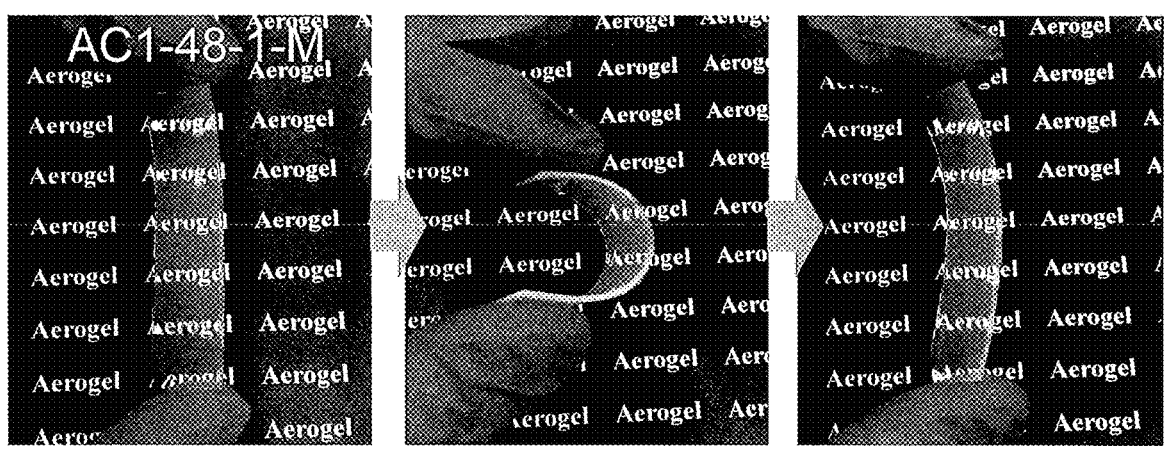
FIG. 25 is a diagram showing states of bending and restoration when the low-density gel product (aerogel) produced in the examples was greatly bent by hand.
Figure 26A:
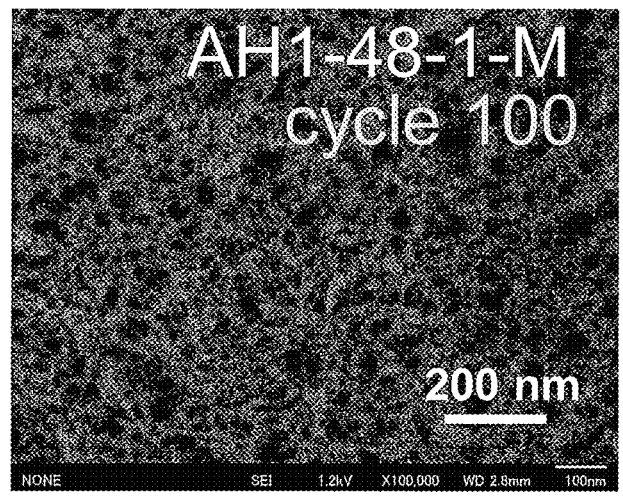
FIG. 26A is a diagram showing an SEM observation image of a cross-section of the low-density gel product (xerogel) produced in the examples.
Figure 26B:
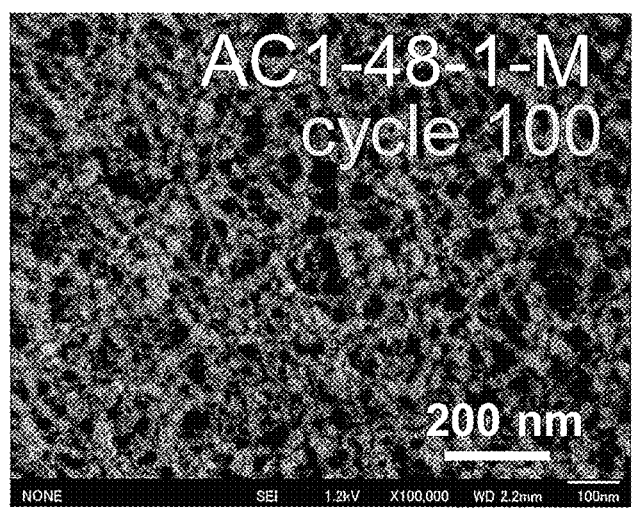
FIG. 26B is a diagram showing an SEM observation image of a cross-section of the low-density gel product (xerogel) produced in the examples.
Figure 26C:
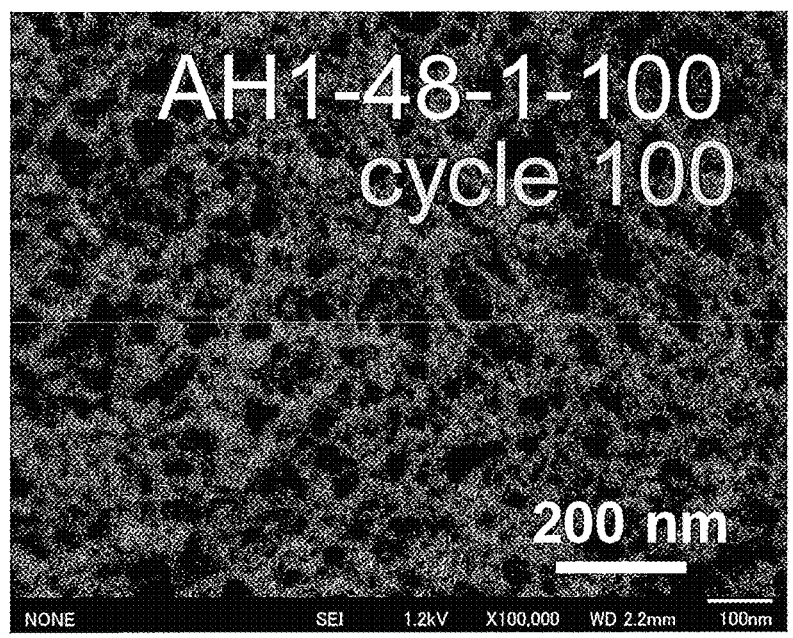
FIG. 26C is a diagram showing an SEM observation image of a cross-section of the low-density gel product (xerogel) produced in the examples.

Additionally, xerogel samples AH1-48-1-M, AC1-48-1-M, and AH1-48-1-100 had excellent mechanical properties comparable to those of aerogel samples SH1-48-1 and SC1-48-1. As shown in FIG. 22A, FIG. 22B, FIG. 23, FIG. 24A, FIG. 24B, and FIG. 25, these samples had high compression flexibility and bending flexibility. For example, these samples were able to be compressed at a compression rate of 80% without causing cracks, and were able to quickly return to substantially the original shape by removing the compressive force. Moreover, even after 100 cycles of compression and release, these samples were able to return to substantially the original shape (see FIG. 22A and FIG. 22B), and the specific surface areas (SSAs), the pore diameters, and the three-dimensional network structures were also maintained (see FIG. 26A to FIG. 26C). FIG. 22A and FIG. 22B are graphs showing S-S curves by the uniaxial compression test for the xerogel samples, and FIG. 23 is a graph showing S-S curves by the three-point flexural test for the xerogel samples. FIG. 24A and FIG. 24B are diagrams showing states of compression and restoration during the uniaxial compression test (compression rate: 80%) and states of bending and restoration during the three-point flexural test (displacement amount: about 8 mm) for sample AC1-48-1-M. FIG. 25 is a diagram showing a state of restoration when sample AC1-48-1-M was greatly bent by hand. Sample AC1-48-1-M was able to return to substantially the original shape by removing the bending force. It was confirmed that these low-density gel products have very high bending properties. FIGS. 26A to 26C are diagrams showing SEM observation images of cross-sections after 100 cycles of the uniaxial compression test for samples AH1-48-1-M, AC1-48-1-M, and AH1-48-1-100.

Figure 27:
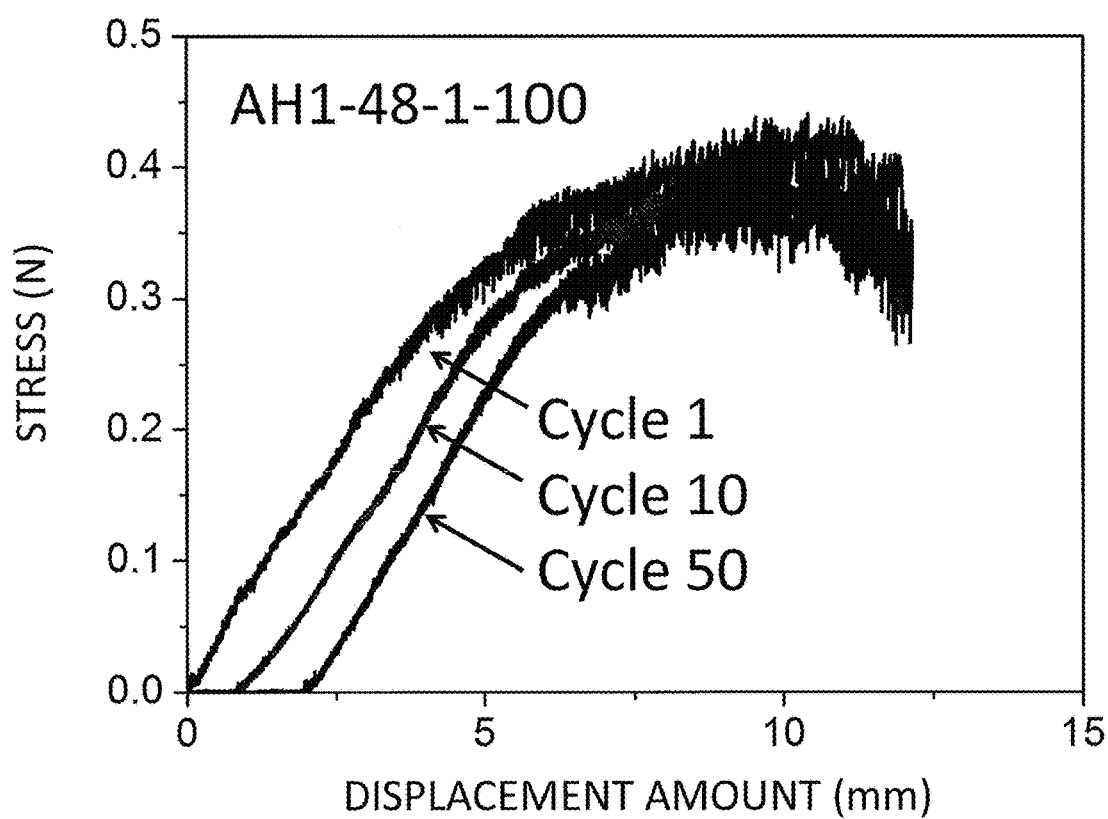
FIG. 27 is a graph showing S-S curves in the three-point flexural test of the low-density gel products (xerogels) produced in the examples.

Furthermore, these xerogel samples were able to return to substantially the original shape even after the three-point flexural test with a large displacement amount (17 to 20 mm). Moreover, as shown in FIG. 27, these xerogel samples exhibited very high bending flexibility without causing cracks even after 20 cycles of the three-point flexural test with a displacement amount of 12 mm. Such excellent mechanical properties exhibited by the low-density gel product of the present disclosure, including aerogel and xerogel, cannot be achieved by conventional low-density gel products composed of silica, metal oxide, cellulose, polymer, or carbon, and conventional low-density gel products that are silica-based organic-inorganic hybrid gels.

As shown in Table 3, the thermal conductivities at room temperature of samples SH1-48-2, SC1-48-1, and SC1-48-2 were very low and were 15.2 mW/(m·K), 16.4 mW/(m·K), and 16.2 mw/(m·K), respectively. The thermal conductivity values are substantially equal to those of conventional silica aerogels and PMSQ aerogels. The thermal conductivities at room temperature of samples AC1-48-1-M and AH1-48-1-100, which are xerogels obtained by normal-pressure drying, were low similar to those of the above aerogel samples, and were 16.5 mW/(m·K) and 15.4 mW/(m·K), respectively. These low-density gel products were gel products that have very excellent mechanical properties, particularly, high bending flexibility, but in which an increase in thermal conductivity is inhibited.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The low-density gel product of the present invention has excellent properties that are not exhibited by conventional low-density gel products, that is, high mechanical properties including bending flexibility. The low-density gel product of the present invention is expected to be applied to various uses focusing on these properties.

The invention claimed is:

1. A low-density gel product having a skeleton containing a polysiloxane chain and an organic polymer chain,
wherein the low-density gel product is an aerogel, a xerogel, or a cryogel,
wherein in the skeleton, the polysiloxane chain and the organic polymer chain are bonded to each other by covalent bonds at a plurality of positions on both of the chains with silicon atoms of the polysiloxane chain as bonding points,
wherein the polysiloxane chain and the organic polymer chain are bonded to each other via a linking part L of the repeating unit that is included in the organic polymer chain and is represented by the following formula (2):

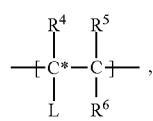

wherein $R^4$ in formula (2) is a hydrogen atom, an alkyl group that may have a branch, a phenyl group that may have a substituent, a hydroxyl group, or a halogen atom,
$R^5$ and $R^6$ are each independently a hydrogen atom, an alkyl group that may have a branch, a phenyl group that may have a substituent, a hydroxyl group, a halogen atom, an N,N-dimethylamide group, or an N-isopropylamide group,
the linking part L is selected from the group consisting of: an alkylene group that may be cyclic or may have a branch and has 1 to 10 carbon atoms; a phenylene group that may have a substituent; an amide group; an ether group; a combination thereof; or a bond, and when the linking part L is a bond, the silicon atom of the polysiloxane chain is directly bonded to C* in formula (2).

2. The low-density gel product according to claim 1, wherein the polysiloxane chain is a polyorganosiloxane chain.

3. The low-density gel product according to claim 2, wherein an organo group bonded to the silicon atom of the polyorganosiloxane chain is an alkyl group having 1 to 4 carbon atoms.

4. The low-density gel product according to claim 3, wherein the organo is a methyl group.

5. The low-density gel product according to claim 1, wherein the organic polymer chain has a degree of polymerization of 2 to 10000.

6. The low-density gel product according to claim 1, wherein, when the low-density gel product is made into a sheet having a thickness of 2 mm, a transmittance for light having a wavelength of 550 nm in a thickness direction is 70% or more.

7. The low-density gel product according to claim 1, wherein the low-density gel product has a thermal conductivity of 20 mW/(m·K) or less.

8. A method for producing a low-density gel product, comprising:
(A) gelling, in which
in a solution system containing an organic precursor chain having repeating units A, wherein the organic precursor chain has, in a side chain, a silicon atom to which two or more hydrolyzable functional groups are bonded, a hydrolysis reaction of the functional groups located in the side chains of the repeating units A and a polycondensation reaction between the side chains having the silicon atoms are caused to proceed by a sol-gel process,
an organic polymer chain having a main chain comprising the organic precursor chain and a polysiloxane chain that contains the silicon atoms is formed, wherein the polysiloxane chain is bonded to the organic polymer chain by a covalent bond at a position where the side chains are bonded to the organic polymer chain, and
a wet gel including a skeleton phase that is rich in the polysiloxane chain and the organic polymer chain, and a solution phase that is rich in a solvent of the solution system, is formed; and
(B) drying the wet gel to obtain a low-density gel product having pores and a skeleton containing the polysiloxane chain and the organic polymer chain bonded to each other,
wherein the low-density gel product is an aerogel, a xerogel, or a cryogel,
the aerogel is obtained by drying the wet gel by a drying method including supercritical drying,
the xerogel is obtained by drying the wet gel by a drying method including a normal-pressure drying, and
the cryogel is obtained by drying the wet gel by a drying method including freeze-drying,
wherein the skeleton phase becomes the skeleton and the solution phase becomes pores by the drying,
wherein the repeating unit A is a unit represented by the following formula (1):

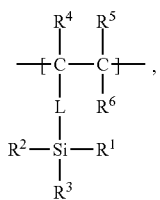

wherein the formed polysiloxane chain and the formed organic polymer chain are bonded to each other via a linking part L in formula (1), wherein $R^1$ in formula (1) is a hydrolyzable functional group or an organo group, $R^2$ and $R^3$ are each a hydrolyzable functional group, $R^4$ is a hydrogen atom, an alkyl group that may have a branch, a phenyl group that may have a substituent, a hydroxyl group, or a halogen atom, $R^5$ and $R^6$ are each independently a hydrogen atom, an alkyl group that may have a branch, a phenyl group that may have a substituent, a hydroxyl group, a halogen atom, an N,N-dimethylamide group, or an N-isopropylamide group, the linking part L is selected from the group consisting of: an alkylene group that may be cyclic or may have a branch and that has 1 to 10 carbon atoms; a phenylene group that may have a substituent; an amide group; an ether group; a combination thereof; and a bond, and when the linking part L is a bond, the silicon atom of the polysiloxane chain and the carbon atom of the organic polymer chain are directly bonded to each other.

9. The method for producing a low-density gel product according to claim 8, further comprising forming the organic precursor chain having repeating units A, wherein in the forming, a silicon compound having a silicon atom to which the two or more hydrolyzable functional groups are bonded and further having a polymerizable group is caused to polymerize, wherein the polymerizable groups on the silicon compound or a plurality of silicon compounds are caused to react with each other.

10. The method for producing a low-density gel product according to claim 9, wherein the polymerizable group is at least one group selected from the group consisting of a vinyl group, a vinylidene group, an allyl group, and a (meth)acrylic group.

11. The method for producing a low-density gel product according to claim 8, wherein an organo group is bonded to the silicon atom, and a polyorganosiloxane chain is formed as the polysiloxane chain.

12. The method for producing a low-density gel product according to claim 11, wherein the organo group is an alkyl group having 1 to 4 carbon atoms.

13. The method for producing a low-density gel product according to claim 8, wherein the solution system further comprises a basic catalyst.

14. The method for producing a low-density gel product according to claim 8, wherein the solution system further comprises a phase separation inhibitor.

15. The method for producing a low-density gel product according to claim 8, wherein the hydrolyzable functional groups are each an alkoxy group having 1 to 4 carbon atoms.

16. The method for producing a low-density gel product according to claim 8, wherein a degree of polymerization of the repeating units A in the organic precursor chain is 2 to 10000.

17. The method for producing a low-density gel product according to claim 8, wherein the wet gel is dried by a normal pressure drying so as to obtain a xerogel as the low-density gel product.

18. The method according to claim 10, wherein the polymerizable group is a vinyl group.

19. The low-density gel product according to claim 1, wherein the low-density gel product is an aerogel or a xerogel.

20. The method for producing a low-density gel product according to claim 8, wherein the low-density gel product is an aerogel or a xerogel.

21. A low-density gel product having a skeleton containing a polysiloxane chain and an organic polymer chain, wherein in the skeleton, the polysiloxane chain and the organic polymer chain are bonded to each other by covalent bonds at a plurality of positions on both of the chains with silicon atoms of the polysiloxane chain as bonding points, wherein the polysiloxane chain and the organic polymer chain are bonded to each other via a linking part L of the repeating unit that is included in the organic polymer chain and is represented by the following formula (2):

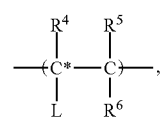

wherein $R^4$ in formula (2) is a hydrogen atom, an alkyl group that may have a branch, a phenyl group that may have a substituent, a hydroxyl group, or a halogen atom, $R^5$ and $R^6$ are each independently a hydrogen atom, an alkyl group that may have a branch, a phenyl group that may have a substituent, a hydroxyl group, a halogen atom, an N,N-dimethylamide group, or an N-isopropylamide group, the linking part L is selected from the group consisting of: an alkylene group that may be cyclic or may have a branch and has 1 to 10 carbon atoms; a phenylene group that may have a substituent; an amide group; an ether group; a combination thereof; or a bond, and when the linking part L is a bond, the silicon atom of the polysiloxane chain is directly bonded to C* in formula (2), and wherein, when the low-density gel product is made into a sheet having a thickness of 2 mm, a transmittance for light having a wavelength of 550 nm in a thickness direction is 70% or more.

* * * * *